US012483936B2

(12) United States Patent
Balasubramanian et al.

(10) Patent No.: US 12,483,936 B2
(45) Date of Patent: Nov. 25, 2025

(54) TECHNIQUES FOR RESOURCE RESERVATIONS FOR USER EQUIPMENT RELAYS

(71) Applicant: QUALCOMM Incorporated, San Diego, CA (US)

(72) Inventors: Anantharaman Balasubramanian, San Diego, CA (US); Junyi Li, Fairless Hills, PA (US); Hong Cheng, Basking Ridge, NJ (US); Shuanshuan Wu, San Diego, CA (US); Kapil Gulati, Belle Mead, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 350 days.

(21) Appl. No.: 17/653,241

(22) Filed: Mar. 2, 2022

(65) Prior Publication Data

US 2023/0284096 A1 Sep. 7, 2023

(51) Int. Cl.
*H04W 28/26* (2009.01)
*H04L 5/14* (2006.01)
*H04W 88/04* (2009.01)

(52) U.S. Cl.
CPC .............. *H04W 28/26* (2013.01); *H04L 5/14* (2013.01); *H04W 88/04* (2013.01)

(58) Field of Classification Search
CPC .......... H04W 28/26; H04W 88/04; H04L 5/14
See application file for complete search history.

(56) References Cited

U.S. PATENT DOCUMENTS

| | | | |
|---|---|---|---|
| 2019/0124015 A1* | 4/2019 | Loehr | G06F 21/43 |
| 2021/0058905 A1* | 2/2021 | Ganesan | H04L 5/0014 |
| 2021/0144750 A1* | 5/2021 | Cao | H04W 72/0453 |
| 2021/0267009 A1* | 8/2021 | Van Phan | H04W 76/14 |
| 2021/0314966 A1* | 10/2021 | Hui | H04W 72/56 |
| 2023/0070809 A1* | 3/2023 | Elshafie | H04W 72/044 |
| 2023/0088696 A1* | 3/2023 | Back | H04W 24/10 |
| | | | 370/315 |
| 2023/0171671 A1* | 6/2023 | Paladugu | H04W 40/22 |
| | | | 370/329 |
| 2023/0171826 A1* | 6/2023 | Selvanesan | H04W 76/14 |
| | | | 370/310 |

(Continued)

FOREIGN PATENT DOCUMENTS

| | | |
|---|---|---|
| EP | 3952170 A1 | 2/2022 |
| WO | WO-2021255192 A1 | 12/2021 |

OTHER PUBLICATIONS

International Search Report and Written Opinion—PCT/US2023/061740—ISA/EPO—Jun. 9, 2023.

*Primary Examiner* — Kenny S Lin
(74) *Attorney, Agent, or Firm* — Dalei Dong; Harrity & Harrity, LLP

(57) ABSTRACT

Various aspects of the present disclosure generally relate to wireless communication. In some aspects, a first user equipment (UE) may transmit, to a second UE, an indication of a first reservation of a first resource associated with a first relay link of a UE-to-UE relay, wherein the first reservation is based at least in part on a second reservation of a second resource associated with a second relay link of the UE-to-UE relay. The UE may perform a sidelink communication in accordance with the first resource. Numerous other aspects are described.

30 Claims, 11 Drawing Sheets

(56) References Cited

U.S. PATENT DOCUMENTS

| | | | |
|---|---|---|---|
| 2023/0232201 A1* | 7/2023 | Miao | H04L 5/0048 |
| | | | 370/329 |
| 2023/0254884 A1* | 8/2023 | Ibrahim | H04W 72/541 |
| | | | 370/329 |
| 2023/0389046 A1* | 11/2023 | Kim | H04W 4/90 |
| 2024/0032075 A1* | 1/2024 | Ye | H04W 72/40 |
| 2024/0073989 A1* | 2/2024 | Back | H04W 68/02 |

* cited by examiner

TECHNIQUES FOR RESOURCE RESERVATIONS FOR USER EQUIPMENT RELAYS

FIELD OF THE DISCLOSURE

Aspects of the present disclosure generally relate to wireless communication and to techniques and apparatuses for resource reservations for user equipment relays.

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a first user equipment (UE). The method may include transmitting, to a second UE, an indication of a first reservation of a first resource associated with a first relay link of a UE-to-UE relay, wherein the first reservation is based at least in part on a second reservation of a second resource associated with a second relay link of the UE-to-UE relay. The method may include performing a sidelink communication in accordance with the first resource.

Some aspects described herein relate to a method of wireless communication performed by a first UE. The method may include receiving, from a second UE, an indication of a first reservation of a first resource associated with a first relay link of a UE-to-UE relay and an indication of a second reservation of a second resource associated with a second relay link of the UE-to-UE relay, wherein the first UE is a relay UE associated with the UE-to-UE relay, wherein the second UE and a third UE are remote UEs associated with the UE-to-UE relay, wherein the first UE is in communication with the second UE via the first relay link of UE-to-UE relay, wherein the first UE is in communication with the third UE via the second relay link of the UE-to-UE relay, and wherein the first reservation is based at least in part on the second reservation. The method may include performing a sidelink communication in accordance with the first resource and the second resource.

Some aspects described herein relate to an apparatus for wireless communication at a first UE. The apparatus may include a memory and one or more processors coupled to the memory. The one or more processors may be configured to transmit, to a second UE, an indication of a first reservation of a first resource associated with a first relay link of a UE-to-UE relay, wherein the first reservation is based at least in part on a second reservation of a second resource associated with a second relay link of the UE-to-UE relay. The one or more processors may be configured to perform a sidelink communication in accordance with the first resource.

Some aspects described herein relate to an apparatus for wireless communication at a first UE. The apparatus may include a memory and one or more processors coupled to the memory. The one or more processors may be configured to receive, from a second UE, an indication of a first reservation of a first resource associated with a first relay link of a UE-to-UE relay and an indication of a second reservation of a second resource associated with a second relay link of the UE-to-UE relay, wherein the first UE is a relay UE associated with the UE-to-UE relay, wherein the second UE and a third UE are remote UEs associated with the UE-to-UE relay, wherein the first UE is in communication with the second UE via the first relay link of UE-to-UE relay, wherein the first UE is in communication with the third UE via the second relay link of the UE-to-UE relay, and wherein the first reservation is based at least in part on the second reservation. The one or more processors may be configured to perform a sidelink communication in accordance with the first resource and the second resource.

Some aspects described herein relate to a non-transitory computer-readable medium that stores a set of instructions for wireless communication by a first UE. The set of instructions, when executed by one or more processors of the first UE, may cause the first UE to transmit, to a second UE, an indication of a first reservation of a first resource associated with a first relay link of a UE-to-UE relay, wherein the first reservation is based at least in part on a second reservation of a second resource associated with a second relay link of the UE-to-UE relay. The set of instructions, when executed by one or more processors of the first UE, may cause the first UE to perform a sidelink communication in accordance with the first resource.

Some aspects described herein relate to a non-transitory computer-readable medium that stores a set of instructions for wireless communication by a first UE. The set of instructions, when executed by one or more processors of the first UE, may cause the first UE to receive, from a second UE, an indication of a first reservation of a first resource associated with a first relay link of a UE-to-UE relay and an indication of a second reservation of a second resource associated with a second relay link of the UE-to-UE relay, wherein the first UE is a relay UE associated with the UE-to-UE relay, wherein the second UE and a third UE are remote UEs associated with the UE-to-UE relay, wherein the first UE is in communication with the second UE via the first relay link of UE-to-UE relay, wherein the first UE is in communication with the third UE via the second relay link of the UE-to-UE relay, and wherein the first reservation is based at least in part on the second reservation. The set of instructions, when executed by one or more processors of the first UE, may cause the first UE to perform a sidelink communication in accordance with the first resource and the second resource.

Some aspects described herein relate to an apparatus for wireless communication. The apparatus may include means for transmitting, to a first UE, an indication of a first reservation of a first resource associated with a first relay link of a UE-to-UE relay, wherein the first reservation is based at least in part on a second reservation of a second resource associated with a second relay link of the UE-to-UE relay. The apparatus may include means for performing a sidelink communication in accordance with the first resource.

Some aspects described herein relate to an apparatus for wireless communication. The apparatus may include means for receiving, from a first UE, an indication of a first reservation of a first resource associated with a first relay link of a UE-to-UE relay and an indication of a second reservation of a second resource associated with a second relay link of the UE-to-UE relay, wherein the apparatus is associated with a relay UE associated with the UE-to-UE relay, wherein the first UE and a second UE are remote UEs associated with the UE-to-UE relay, wherein the apparatus is in communication with the first UE via the first relay link of UE-to-UE relay, wherein the apparatus is in communication with the second UE via the second relay link of the UE-to-UE relay, and wherein the first reservation is based at least in part on the second reservation. The apparatus may include means for performing a sidelink communication in accordance with the first resource and the second resource.

Aspects generally include a method, apparatus, system, computer program product, non-transitory computer-readable medium, user equipment, base station, wireless communication device, and/or processing system as substantially described herein with reference to and as illustrated by the drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
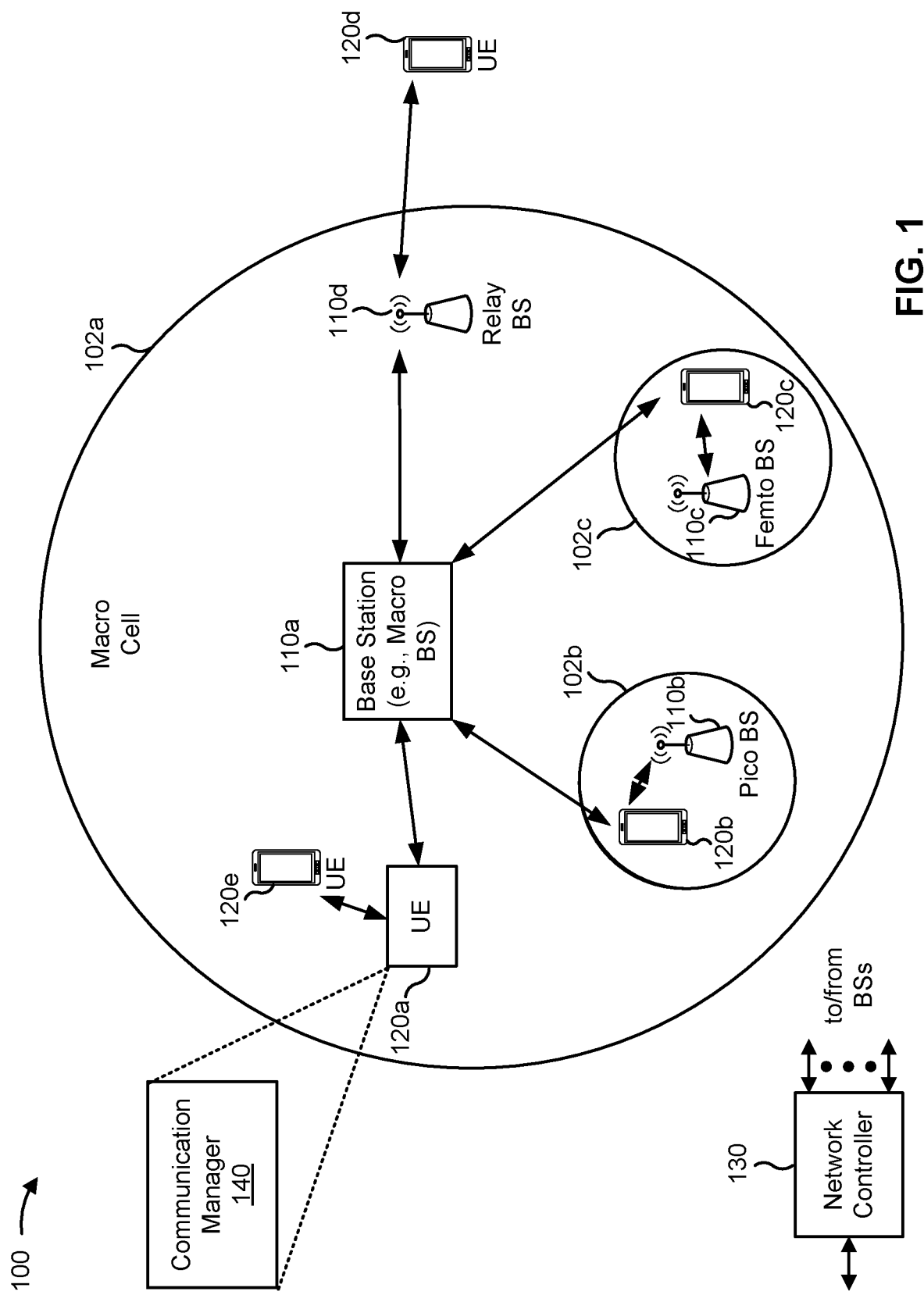
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Moreover, although shown as an integral unit in FIG. 1 for ease of description, aspects of the disclosure are not so limited. In some other aspects, one or more base stations 110 may be disaggregated according to an open radio access network (RAN) (O-RAN) architecture or the like, which is described in more detail in connection with FIG. 3. Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHZ, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHZ), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHZ, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 (sometimes referred to a first UE) may include a communication manager 140. As described in more detail elsewhere herein, the communication manager 140 may transmit, to a second UE, an indication of a first reservation of a first resource associated with a first relay link of a UE-to-UE relay, wherein the first reservation is based at least in part on a second reservation of a second resource associated with a second relay link of the UE-to-UE relay; and perform a sidelink communication in accordance with the first resource.

In some aspects, the communication manager 140 may receive, from a second UE, an indication of a first reservation of a first resource associated with a first relay link of a UE-to-UE relay and an indication of a second reservation of a second resource associated with a second relay link of the UE-to-UE relay, wherein the first UE is a relay UE associated with the UE-to-UE relay, wherein the second UE and a third UE are remote UEs associated with the UE-to-UE relay, wherein the first UE is in communication with the second UE via the first relay link of UE-to-UE relay, wherein the first UE is in communication with the third UE via the second relay link of the UE-to-UE relay, and wherein the first reservation is based at least in part on the second reservation; and perform a sidelink communication in accordance with the first resource and the second resource. Additionally, or alternatively, the communication manager 140 may perform one or more other operations described herein.

As indicated above, FIG. 1 is provided as an example. Other examples may differ from what is described with regard to FIG. 1.

Figure 2:
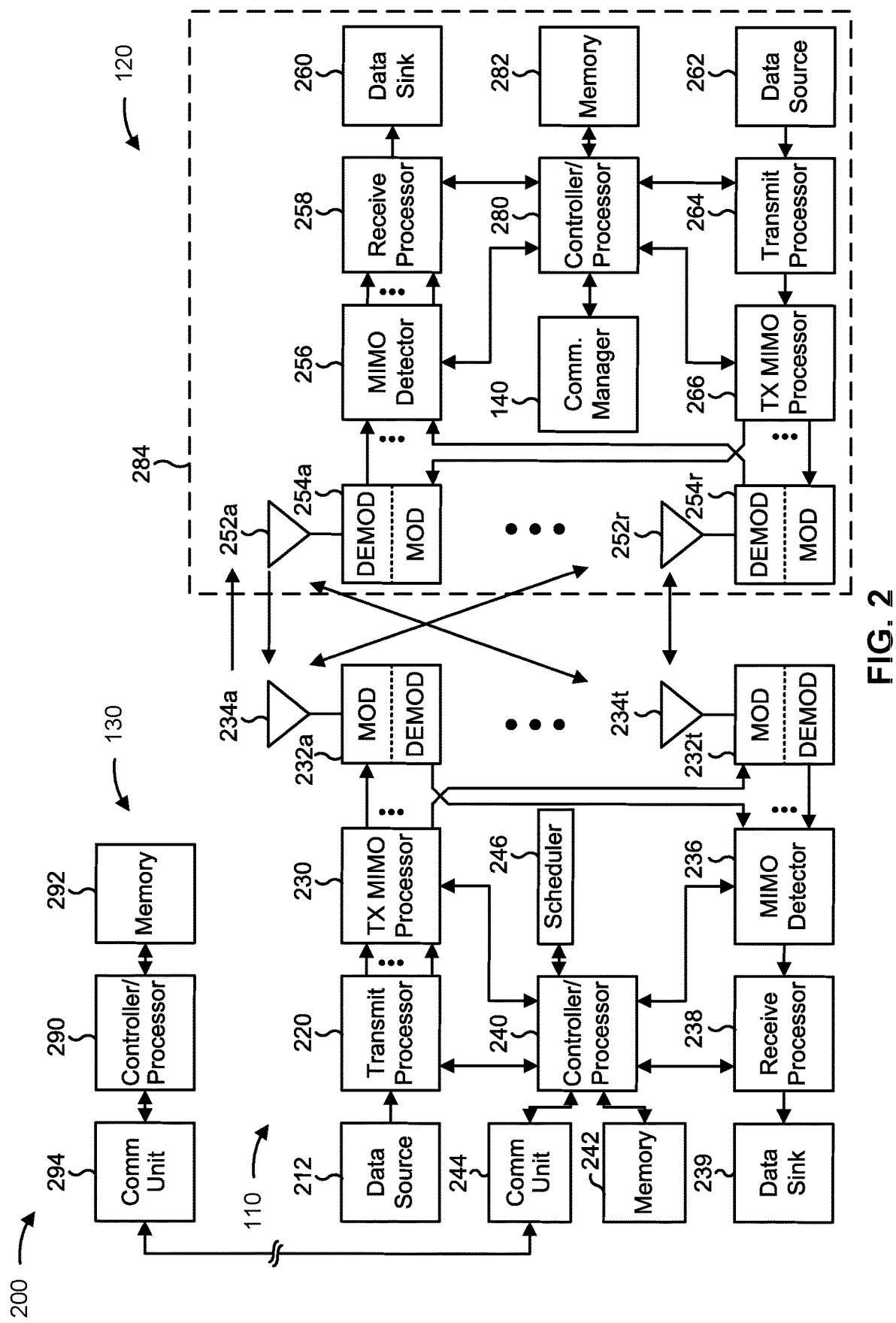
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 6-11).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 6-11).

The controller/processor 240 of the base station 110, the controller/processor 280 of the UE 120, and/or any other component(s) of FIG. 2 may perform one or more techniques associated with resource reservations for UE relays, as described in more detail elsewhere herein. For example, the controller/processor 240 of the base station 110, the controller/processor 280 of the UE 120, and/or any other component(s) of FIG. 2 may perform or direct operations of, for example, process 800 of FIG. 8, process 900 of FIG. 9, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 800 of FIG. 8, process 900 of FIG. 9, and/or other processes as described herein. In some examples, executing instructions may include running the instructions, converting the instructions, compiling the instructions, and/or interpreting the instructions, among other examples.

In some aspects, a first UE (e.g., the UE 120) includes means for transmitting, to a second UE, an indication of a first reservation of a first resource associated with a first relay link of a UE-to-UE relay, wherein the first reservation is based at least in part on a second reservation of a second resource associated with a second relay link of the UE-to-UE relay; and/or means for performing a sidelink communication in accordance with the first resource. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a first UE (e.g., the UE 120) includes means for receiving, from a second UE, an indication of a first reservation of a first resource associated with a first relay link of a UE-to-UE relay and an indication of a second reservation of a second resource associated with a second relay link of the UE-to-UE relay, wherein the UE 120 is a relay UE associated with the UE-to-UE relay, wherein the second UE and a third UE are remote UEs associated with the UE-to-UE relay, wherein the UE 120 is in communication with the second UE via the first relay link of UE-to-UE relay, wherein the UE 120 is in communication with the third UE via the second relay link of the UE-to-UE relay, and wherein the first reservation is based at least in part on the second reservation; and/or means for performing a sidelink communication in accordance with the first resource and the second resource. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
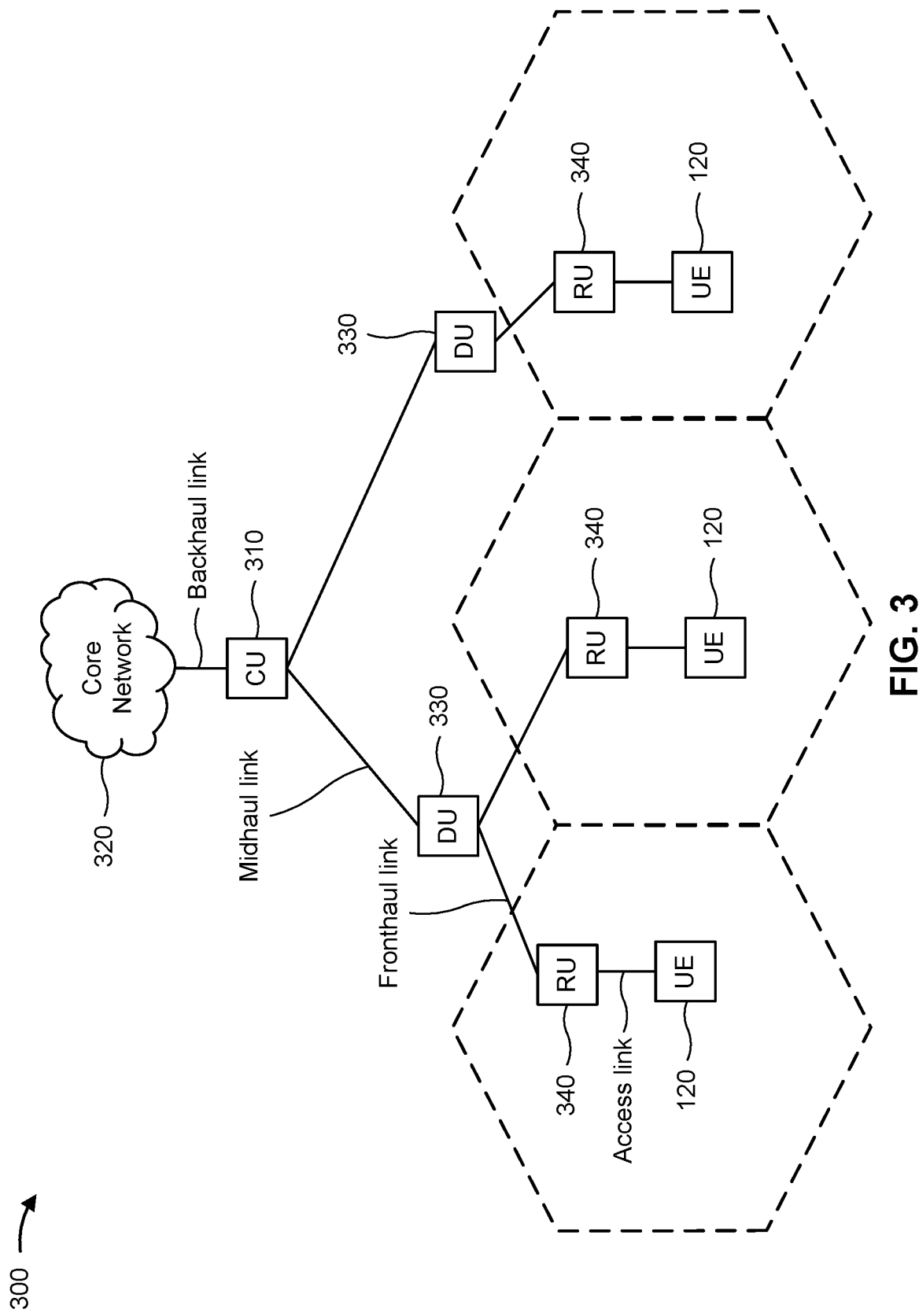
FIG. 3 is a diagram illustrating an example of an open radio access network architecture, in accordance with the present disclosure.

FIG. 3 is a diagram illustrating an example 300 of an O-RAN architecture, in accordance with the present disclosure. As shown in FIG. 3, the O-RAN architecture may include a control unit (CU) 310 that communicates with a core network 320 via a backhaul link. Furthermore, the CU 310 may communicate with one or more distributed units (DUs) 330 via respective midhaul links. The DUs 330 may each communicate with one or more radio units (RUs) 340 via respective fronthaul links, and the RUs 340 may each communicate with respective UEs 120 via radio frequency (RF) access links. The DUs 330 and the RUs 340 may also be referred to as O-RAN DUS (O-DUs) 330 and O-RAN RUs (O-RUs) 340, respectively.

In some aspects, the DUs 330 and the RUs 340 may be implemented according to a functional split architecture in which functionality of a base station 110 (e.g., an eNB or a gNB) is provided by a DU 330 and one or more RUs 340 that communicate over a fronthaul link. Accordingly, as described herein, a base station 110 may include a DU 330 and one or more RUs 340 that may be co-located or geographically distributed. In some aspects, the DU 330 and the associated RU(s) 340 may communicate via a fronthaul link to exchange real-time control plane information via a lower layer split (LLS) control plane (LLS-C) interface, to exchange non-real-time management information via an LLS management plane (LLS-M) interface, and/or to exchange user plane information via an LLS user plane (LLS-U) interface.

Accordingly, the DU 330 may correspond to a logical unit that includes one or more base station functions to control the operation of one or more RUs 340. For example, in some aspects, the DU 330 may host a radio link control (RLC) layer, a medium access control (MAC) layer, and one or more high physical (PHY) layers (e.g., forward error correction (FEC) encoding and decoding, scrambling, and/or modulation and demodulation) based at least in part on a lower layer functional split. Higher layer control functions, such as a packet data convergence protocol (PDCP), radio resource control (RRC), and/or service data adaptation protocol (SDAP), may be hosted by the CU 310. The RU(s) 340 controlled by a DU 330 may correspond to logical nodes that host RF processing functions and low-PHY layer functions (e.g., fast Fourier transform (FFT), inverse FFT (iFFT), digital beamforming, and/or physical random access channel (PRACH) extraction and filtering) based at least in part on the lower layer functional split. Accordingly, in an O-RAN architecture, the RU(s) 340 handle all over the air (OTA) communication with a UE 120, and real-time and non-real-time aspects of control and user plane communication with the RU(s) 340 are controlled by the corresponding DU 330, which enables the DU(s) 330 and the CU 310 to be implemented in a cloud-based RAN architecture.

As indicated above, FIG. 3 is provided as an example. Other examples may differ from what is described with regard to FIG. 3.

Figure 4:
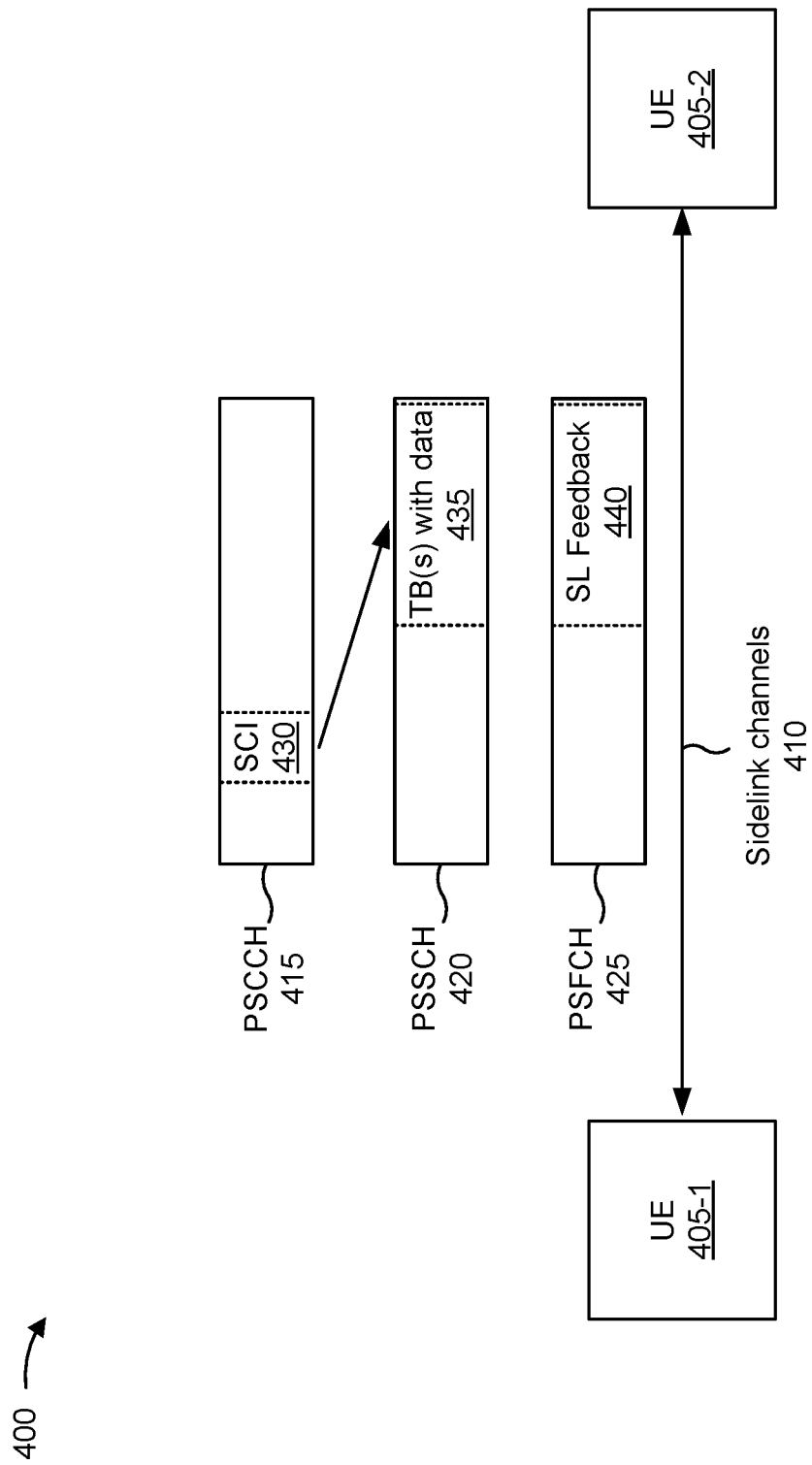
FIG. 4 is a diagram illustrating an example of sidelink communications, in accordance with the present disclosure.

FIG. 4 is a diagram illustrating an example 400 of sidelink communications, in accordance with the present disclosure.

As shown in FIG. 4, a first UE 405-1 may communicate with a second UE 405-2 (and one or more other UEs 405) via one or more sidelink channels 410. The UEs 405-1 and 405-2 may communicate using the one or more sidelink channels 410 for P2P communications, D2D communications, V2X communications (e.g., which may include V2V communications, V2I communications, and/or V2P communications) and/or mesh networking. In some aspects, the UEs 405 (e.g., UE 405-1 and/or UE 405-2) may correspond to one or more other UEs described elsewhere herein, such as UE 120. In some aspects, the one or more sidelink channels 410 may use a PC5 interface and/or may operate in a high frequency band (e.g., the 5.9 GHz band). Additionally, or alternatively, the UEs 405 may synchronize timing of transmission time intervals (TTIs) (e.g., frames, subframes, slots, or symbols) using global navigation satellite system (GNSS) timing.

As further shown in FIG. 4, the one or more sidelink channels 410 may include a physical sidelink control channel (PSCCH) 415, a physical sidelink shared channel (PSSCH) 420, and/or a physical sidelink feedback channel (PSFCH) 425. The PSCCH 415 may be used to communicate control information, similar to a physical downlink control channel (PDCCH) and/or a physical uplink control channel (PUCCH) used for cellular communications with a base station 110 via an access link or an access channel. The PSSCH 420 may be used to communicate data, similar to a physical downlink shared channel (PDSCH) and/or a physical uplink shared channel (PUSCH) used for cellular communications with a base station 110 via an access link or an access channel. For example, the PSCCH 415 may carry sidelink control information (SCI) 430, which may indicate various control information used for sidelink communications, such as one or more resources (e.g., time resources, frequency resources, and/or spatial resources) where a transport block (TB) 435 may be carried on the PSSCH 420. The TB 435 may include data. The PSFCH 425 may be used to communicate sidelink feedback 440, such as hybrid automatic repeat request (HARQ) feedback (e.g., acknowledgement or negative acknowledgement (ACK/NACK) information), transmit power control (TPC), and/or a scheduling request (SR).

Although shown on the PSCCH 415, in some aspects, the SCI 430 may include multiple communications in different stages, such as a first stage SCI (SCI-1) and a second stage SCI (SCI-2). The SCI-1 may be transmitted on the PSCCH 415. The SCI-2 may be transmitted on the PSSCH 420. The SCI-1 may include, for example, an indication of one or more resources (e.g., time resources, frequency resources, and/or spatial resources) on the PSSCH 420, information for decoding sidelink communications on the PSSCH, a quality of service (QOS) priority value, a resource reservation period, a PSSCH demodulation reference signal (DMRS) pattern, an SCI format for the SCI-2, a beta offset for the SCI-2, a quantity of PSSCH DMRS ports, and/or a modulation and coding scheme (MCS). The SCI-2 may include information associated with data transmissions on the PSSCH 420, such as a hybrid automatic repeat request (HARQ) process ID, a new data indicator (NDI), a source identifier, a destination identifier, and/or a channel state information (CSI) report trigger.

In some aspects, the one or more sidelink channels 410 may use resource pools. For example, a scheduling assignment (e.g., included in SCI 430) may be transmitted in sub-channels using specific resource blocks (RBs) across time. In some aspects, data transmissions (e.g., on the PSSCH 420) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 405 may operate using a sidelink transmission mode (e.g., Mode 1) where resource selection and/or scheduling is performed by a base station 110. For example, the UE 405 may receive a grant (e.g., in downlink control information (DCI) or in a radio resource control (RRC) message, such as for configured grants) from the base station 110 for sidelink channel access and/or scheduling. In some aspects, a UE 405 may operate using a transmission mode (e.g., Mode 2) where resource selection and/or scheduling is performed by the UE 405 (e.g., rather than a base station 110). In some aspects, the UE 405 may reserve a current slot for communication as well as up to two additional future slots within a 32-slot window for future communications. In some aspects, the UE 405 may perform resource selection and/or scheduling by sensing channel availability for transmissions. For example, the UE 405 may measure a received signal strength indicator (RSSI) parameter (e.g., a sidelink-RSSI (S-RSSI) parameter) associated with various sidelink channels, may measure a reference signal received power (RSRP) parameter (e.g., a PSSCH-RSRP parameter) associated with various sidelink channels, and/or may measure a reference signal received quality (RSRQ) parameter (e.g., a PSSCH-RSRQ parameter) associated with various sidelink channels, and may select a channel for transmission of a sidelink communication based at least in part on the measurement(s).

Additionally, or alternatively, the UE 405 may perform resource selection and/or scheduling using SCI 430 received in the PSCCH 415, which may indicate occupied resources and/or channel parameters. Additionally, or alternatively, the UE 405 may perform resource selection and/or scheduling by determining a channel busy rate (CBR) associated with various sidelink channels, which may be used for rate control (e.g., by indicating a maximum number of resource blocks that the UE 405 can use for a particular set of subframes).

In the transmission mode where resource selection and/or scheduling is performed by a UE 405, the UE 405 may generate sidelink grants, and may transmit the grants in SCI 430. A sidelink grant may indicate, for example, one or more parameters (e.g., transmission parameters) to be used for an upcoming sidelink transmission, such as one or more resource blocks to be used for the upcoming sidelink transmission on the PSSCH 420 (e.g., for TBs 435), one or more subframes to be used for the upcoming sidelink transmission, a modulation and coding scheme (MCS) to be used for the upcoming sidelink transmission, and any reservations for future sidelink communications. In some aspects, a UE 405 may generate a sidelink grant that indicates one or more parameters for semi-persistent scheduling (SPS), such as a periodicity of a sidelink transmission. Additionally, or alternatively, the UE 405 may generate a sidelink grant for event-driven scheduling, such as for an on-demand sidelink message.

In some aspects, the SCI 430 may indicate a priority value associated with each resource reservation. In such aspects, a resource reservation associated with a higher priority value may preempt a previous resource reservation associated with a lower priority value. Moreover, in some aspects, one UE may indicate to another UE inter-UE coordination information. For example, the first UE 405-1 may transmit to the second UE 405-2 an inter-UE coordination message that indicates a preferred resource and/or a non-preferred resource for the second UE 405-2 to use for a transmission by the second UE 405-2. The second UE 405-2 may then perform resource selection, resource reselection, and/or resource reservation based at least in part on the inter-UE coordination message received from the first UE 405-1 and/or by sensing channel availability for transmissions, as described. In some aspects, using the inter-UE coordination message, one UE (e.g., the first UE 405-1) may signal to another UE (e.g., the second UE 405-2) an expected and/or potential resource conflict with resources indicated by an SCI transmitted by the other UE. In some aspects, the inter-UE coordination message may be transmitted using dedicated resources for such messages (e.g., using resources specifically configured for transmitting inter-UE coordination messages).

As indicated above, FIG. 4 is provided as an example. Other examples may differ from what is described with respect to FIG. 4.

Figure 5:
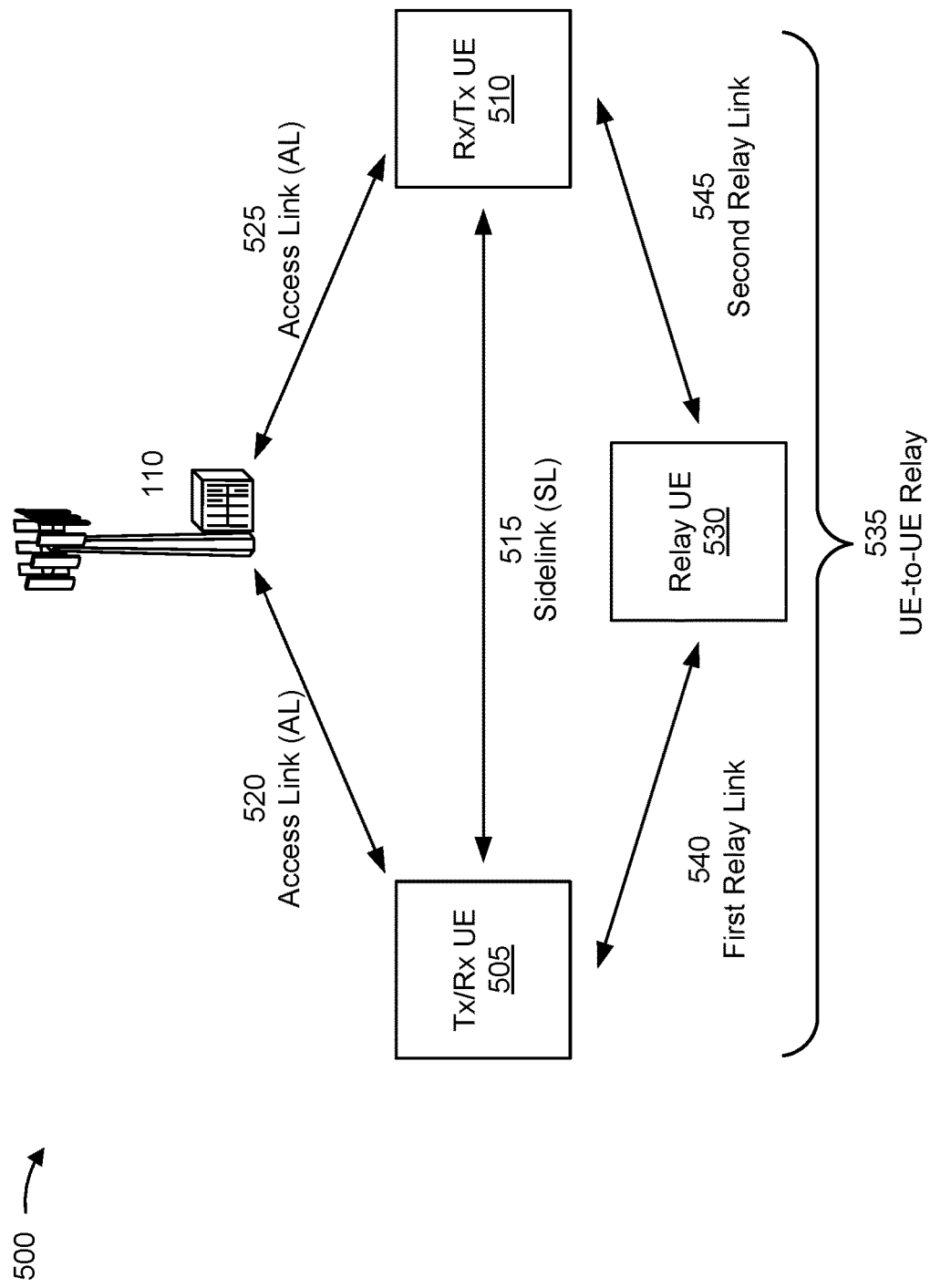
FIG. 5 is a diagram illustrating an example of sidelink communications and access link communications, in accordance with the present disclosure.

FIG. 5 is a diagram illustrating an example 500 of sidelink communications and access link communications, in accordance with the present disclosure.

As shown in FIG. 5, a transmitter (Tx)/receiver (Rx) UE 505 and an Rx/Tx UE 510 may communicate with one another via a sidelink 515, as described above in connection with FIG. 4. As further shown, in some sidelink modes, a base station 110 may communicate with the Tx/Rx UE 505 via a first access link 520. Additionally, or alternatively, in some sidelink modes, the base station 110 may communicate with the Rx/Tx UE 510 via a second access link 525. The Tx/Rx UE 505 and/or the Rx/Tx UE 510 may correspond to one or more UEs described elsewhere herein, such as the UE 120 of FIG. 1 or the UEs 405-1, 405-2 of FIG. 4. Thus, a direct link between UEs 120 (e.g., via a PC5 interface) may be referred to as a sidelink 515, and a direct link between a base station 110 and a UE 120 (e.g., via a Uu interface) may be referred to as an access link 520, 525. Sidelink communications may be transmitted via the sidelink 515, and access link communications may be transmitted via the access link 520, 525. An access link communication may be either a downlink communication (from a base station 110 to a UE 120) or an uplink communication (from a UE 120 to a base station 110).

In some aspects, the Tx/Rx UE 505 and the Rx/Tx UE 510 may communicate via one or more relay UEs, such as a relay UE 530, in a UE-to-UE relay 535. The relay UE 530 may correspond to one or more UEs described elsewhere herein, such as the UE 120 of FIG. 1 or the UEs 405-1, 405-2 of FIG. 4. Utilizing the UE-to-UE relay 535 may be beneficial when the Tx/Rx UE 505 and the Rx/Tx UE 510 are relatively distant from one another and/or when there is not a clear and/or direct channel between the Tx/Rx UE 505 and the Rx/Tx UE 510. In such aspects, the relay UE 530 may forward a communication originating from the Tx/Rx UE 505 (sometimes referred to as a remote UE or, in this case, a source UE) to the Rx/Tx UE 510 (sometimes referred to as another remote UE or, in this case, a destination UE), and/or from the Rx/Tx UE 510 to the Tx/Rx UE 505. The relay UE 530 may be capable of half-duplex communication or full-duplex operation. In aspects in which the relay UE 530 is capable of half-duplex communication and/or is operating in a half-duplex mode, the relay UE 530 may not be capable of concurrently receiving and transmitting packets. Thus, the relay UE 530 may receive a packet (e.g., a TB 435) from the source UE (e.g., Tx/Rx UE 505) at a first time, and forward the packet to the destination UE (e.g., Rx/Tx UE 510) at a later time. In aspects in which the relay UE 530 is capable of full-duplex communication and/or is operating in a full-duplex mode, the relay UE 530 may be capable of concurrently receiving and transmitting packets. Thus, the relay UE 530 may concurrently receive a first packet from the source UE (e.g., Tx/Rx UE 505) and forward a second packet (e.g., a previously transmitted packet from the source UE) to the destination UE (e.g., Rx/Tx UE 510).

Although in FIG. 5 the Tx/Rx UE 505 and the Rx/Tx UE 510 are shown as the only remote UEs, aspects of the disclosure are not so limited. In some other aspects, more than two remote UEs may communicate using the relay 530. For example, the relay UE 530 may be in communication with a group of UEs that includes one or more UEs in addition to the Tx/Rx UE 505 and the Rx/Tx UE 510. In such aspects, the Tx/Rx UE 505, the Rx/Tx UE 510, and the one or more other UEs may be operating in a groupcast mode or similar communication mode. Additionally, or alternatively, the Tx/Rx UE 505, the Rx/Tx UE 510, and the one or more other UEs may be operating as multiple source-destination pairs via the relay UE 530.

Two or more UEs communicating using the relay UE 530 may experience high end-to-end delays due to uncoordinated resource reservations and/or uncertainty regarding resource availability for the multiple relay links (e.g., the first relay link 540 and the second relay link 545, sometimes referred to as hops of the UE-to-UE relay 535). For example, when the Tx/Rx UE 505 transmits a message to the Rx/Tx UE 510 via the UE-to-UE relay 535, the Tx/Rx UE 505 may reserve a first resource for the first relay link 540, and transfer the message to the relay UE 530 using the first resource. The relay UE 530 may then reserve a second resource for the second relay link 545, and transfer the message to the Rx/Tx UE 510 using the second resource. In such aspects, the end-to-end transmission of the message (e.g., the transmission from the Tx/Rx UE 505 to the Rx/Tx UE 510) may experience high latency due to the two different resource reservation processes. Moreover, in some aspects the relay UE 530 may be unable to reserve a second resource for the second relay link 545 due to channel congestion or the like. In such aspects, the message may fail to reach to the Rx/Tx UE 510 altogether, resulting in unreliable UE-to-UE relay communication.

Some techniques and apparatuses described herein enable coordinated resource reservation for UE-to-UE relays, such as the UE-to-UE relay 535. In some aspects, a relay UE (e.g., the relay UE 530) may reserve both a first resource for a source UE (e.g., the Tx/Rx UE 505) to transmit a packet (e.g., the TB 435) to the relay UE, and a second resource for the relay UE to forward the packet to the destination UE (e.g., the Rx/Tx UE 510). In some aspects, the relay UE may indicate the resource reservations using a first inter-UE coordination and/or reservation message transmitted to the source UE, and using a second inter-UE coordination and/or reservation message transmitted to the destination UE. In some other aspects, the relay UE may indicate the resource reservations using a single message transmitted to both the source UE and the destination UE that indicates the coupled resource reservation. In aspects in which a group of UEs are in communication with the relay UE, the relay UE may reserve resources for each remote UE and/or provide group inter-UE coordination and/or reservation information to each UE of the group, such as by a groupcast message, a broadcast message, or the like. In some other aspects, a remote UE (e.g., the source UE, such as the Tx/Rx UE 505) may perform coupled resource reservation (e.g., may reserve both a first resource for the source UE to transmit a packet to a relay UE (e.g., the relay UE 530) and a second resource for the relay UE to forward the packet to the destination UE (e.g., the Rx/Tx UE 510), and/or the remote UE may transmit inter-UE coordination and/or reservation information to the relay UE for forwarding to the destination UE. As a result, aspects of the disclosure reduce end-to-end latency in UE-to-UE relay communications, as well as result in increased sidelink communication reliability.

As indicated above, FIG. 5 is provided as an example. Other examples may differ from what is described with respect to FIG. 5.

Figure 6:
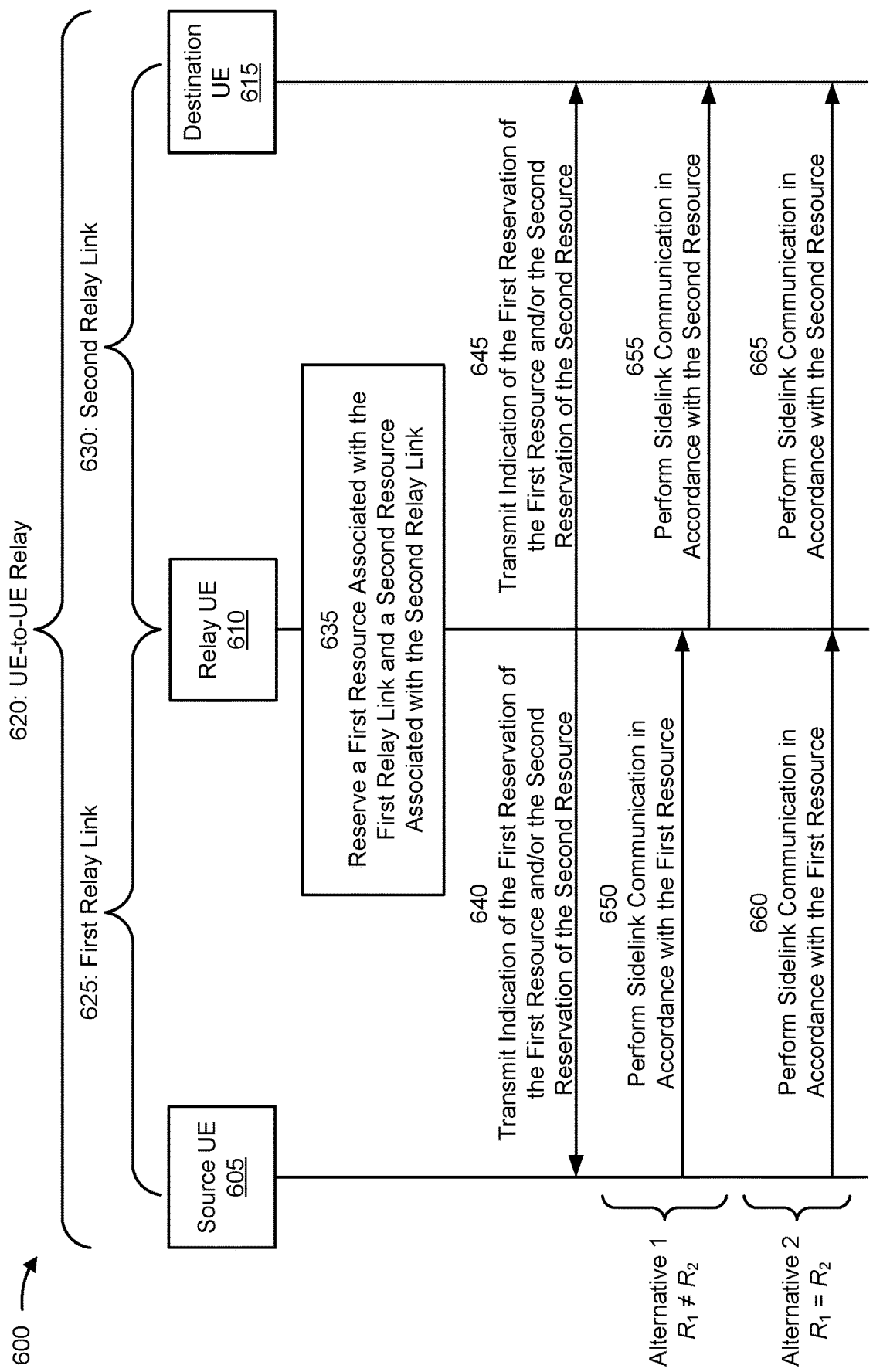
FIG. 6 is a diagram illustrating an example associated with resource reservations for UE relays, in accordance with the present disclosure.

FIG. 6 is a diagram illustrating an example 600 associated with resource reservations for UE relays, in accordance with the present disclosure. As shown in FIG. 6, a source UE 605, a relay UE 610, and a destination UE 615 may be associated with a UE-to-UE relay 620 (e.g., the source UE 605, the relay UE 610, and the destination UE 615 may communicate with one another via the UE-to-UE relay 620). More particularly, the source UE 605 and the relay UE 610 may communicate with one another via a first relay link 625 of the UE-to-UE relay 620, and the relay UE 610 and the destination UE 615 may communicate with one another via a second relay link 630 of the UE-to-UE relay 620. In some aspects, the source UE 605, the relay UE 610, and/or the destination UE 615 may correspond to any of the UEs described herein, such as the UE 120 of FIG. 1, the first UE 405-1 or the second 405-2 of FIG. 4, or the Tx/Rx UE 505, the Rx/Tx UE 510, or the relay UE 530 of FIG. 5. In some aspects, the UE-to-UE relay 620 may correspond to the UE-to-UE relay 535 described in connection with FIG. 5, and thus the first relay link 625 and the second relay link 630 may correspond to the first relay link 540 and the second relay link 545, respectively, described in connection with FIG. 5. Moreover, although not shown, in some aspects, the relay UE 610 may be in communication with one or more other UEs, such as in aspects in which the source UE 605, the relay UE 610, the destination UE 615, and the one or more other UEs are operating in a groupcast mode or the like.

As shown by reference number 635, the relay UE 610 may perform a resource reservation for a sidelink communication using the UE-to-UE relay 620. For example, the relay UE 610 may make a first reservation of a first resource (e.g., time and/or frequency resources for performing a sidelink communication) associated with the first relay link 625 of the UE-to-UE relay 620, and the relay UE 610 may make a second reservation of a second resource (e.g., time and/or frequency resources for performing a sidelink communication) associated with the second relay link 630 of the UE-to-UE relay 620. In some aspects, the first reservation of the first resource may be based at least in part on the second reservation of the second resource. More particularly, the relay UE 610 may make a coordinated and/or coupled reservation of resources to enable a sidelink communication performed using the UE-to-UE relay 620 (e.g., a communication transmitted from the source UE 605 to the destination UE 615 via the relay UE 610) to be transmitted largely uninterrupted. Put another way, the relay UE 610 may reserve the first resource and the second resource such that a packet (e.g., the TB 435) may be transmitted from the source UE 605 to the relay UE 610, and from the relay UE 610 to the destination UE 615, in a pipelined manner.

More particularly, in some aspects, the relay UE 610 may be only capable of half-duplex communication and/or may be operating in a half-duplex mode. When operating in a half-duplex mode, a UE can only receive a packet (e.g., the TB 435) or transmit a packet within a given time resource, but cannot concurrently receive and transmit packets within a given time resource. Thus, when the relay UE 610 is operating in a half-duplex mode, the second resource may be later in time than the first resource. More particularly, the relay UE 610 may reserve the first resource (sometimes referred to as $R_1$) in a first slot (sometimes referred to as slot f) for transmission of a packet (sometimes referred to as packet p, and which, in some aspects, may be a Layer 1 (L1) packet) from the source UE 605 to the relay UE 610. The relay UE 610 may also reserve the second resource (sometimes referred to as $R_2$) in a second slot (sometimes referred to as slot t+k, with k being an integer equal to or greater than 1) for transmission of the packet (e.g., packet p) from the relay UE 610 to the destination UE 615.

In some other aspects, the relay UE 610 may be capable of full-duplex communication and/or may be operating in a full-duplex mode. When operating in a full-duplex mode, a UE is capable of concurrently receiving and transmitting packets within a given time resource. Thus, when the relay UE 610 is operating in a full-duplex mode, the first resource and the second resource may be the same resource (sometimes referred to as R). Put another way, in such aspects the first resource is the second resource (e.g., $R_1=R_2=R$). Thus, the relay UE 610 may reserve the resource (e.g., R) in a slot (e.g., slot 1) for both transmission of a packet (e.g., packet p) from the source UE 605 to the relay UE 610 and for transmission of a previously received packet (e.g., packet p-k, with k being an integer equal to or greater than 1) from the relay UE 610 to the destination UE 615.

As shown by reference numbers 640 and 645, the relay UE 610 may transmit, to the source UE 605 and to the destination UE 615, respectively, an indication of the first reservation of the first resource associated with the first relay link 625 of the UE-to-UE relay 620 and/or an indication of the second reservation of the second resource associated with the second relay link 630 of the UE-to-UE relay 620. In some aspects, the messages used to transmit the indications shown by reference numbers 640 and 645 may be one or more inter-UE coordination and/or reservation messages, similar to the inter-UE coordination message described above in connection with FIG. 4. In some aspects, the indications shown by reference numbers 640 and 645 may be separate messages (e.g., the indication transmitted to the source UE 605 may be independent of the indication transmitted to the destination UE 615). In such aspects, the indication shown by reference number 640 (e.g., the indication transmitted from the relay UE 610 to the source UE 605) may indicate to the source UE 605 that the first resource (e.g., $R_1$, or, for full-duplex modes, R) is a preferred time and/or frequency resource for the source UE 605's transmission (e.g., for the source UE 605 to perform sidelink communication). Moreover, when the relay UE 610 is operating in a half-duplex mode, the indication shown by reference number 645 (e.g., the indication transmitted from the relay UE 610 to the destination UE 615) may indicate to the destination UE 615 that the first resource is a non-preferred time and/or frequency resource for the destination UE 615 to perform sidelink communication. In this way, the destination UE 615 may not attempt to reserve the first resource and/or transmit a communication using the first resource, which may otherwise cause interference with the transmission from the source UE 605 to the relay UE 610.

In some aspects, the indication shown by reference number 645 may further indicate to the destination UE 615 that the second resource (e.g., $R_2$, or, for full-duplex modes, R) may be used for transmitting a packet from the relay UE 610 to the destination UE 615. In some aspects, the indication may do so by indicating to the destination UE 615 that the second resource is a non-preferred resource for the destination UE 615 to perform sidelink communication. In this way, the destination UE 615 may not attempt to reserve the second resource and/or transmit a communication using the second resource, and instead may keep the second resource available for receiving a transmission from the relay UE 610 to the destination UE 615.

Moreover, in some aspects the indication shown by reference number 645 may indicate a priority value associated with the second reservation of the second resource. For example, the destination UE 615 may have previously reserved the second resource for its own transmission, either to the relay UE 610 or to another UE. In such aspects, the relay UE 610 may have received an SCI message from the destination UE 615 indicating the prior reservation of the second resource and/or a priority value associated with the prior reservation of the second resource. In some aspects, the relay UE 610 will thus indicate, via the indication shown by reference number 645, that the second reservation of the second resource (e.g., the relay UE 610's reservation of the second resource for purposes of the UE-to-UE relay 620) has a priority value higher than the priority value associated with destination UE 615's prior reservation, thereby overriding the destination UE 615's prior reservation. Thus, the relay UE 610 may be able to perform the UE-to-UE relay 620 without interruption from the destination UE 615 transmitting using the second resource.

In some aspects, the indications shown by reference numbers 640 and 645 may be the same message (e.g., the same indication may be transmitted to both the source UE 605 and the destination UE 615). In such aspects, the indication may indicate that the first resource (e.g., $R_1$, or, for full-duplex modes, R) is a preferred resource for the source UE 605 to perform a sidelink communication (e.g., to transmit a packet to the relay UE 610), and that the first resource is a non-preferred resource for the destination UE 615 to perform a sidelink communication. The indication may further indicate that the second resource (e.g., $R_2$, or, for full-duplex modes, R) is a non-preferred resource for the destination UE 615 to perform sidelink communication, such that the destination UE 615 does not attempt to transmit a communication using the second resource and instead leaves the second resource available for receiving a transmission from the relay UE 610 to the destination UE 615. In aspects in which the destination UE 615 already reserved the second resource as indicated by an SCI message of the destination UE 615 or the like, the indication may further indicate that the second reservation of the second resource is associated with a higher priority value that the priority value associated with the destination UE 615's previous reservation, as discussed.

In aspects in which the same message is used to transmit both the indication shown by reference number 640 and the indication shown by reference number 645, the message may include an L1 destination identifier associated with both the source UE 605 and the destination UE 615, such that each UE 605, 615 receives the message and/or the corresponding reservation information. In some aspects, the message including the reservation information and/or the L1 destination identifier associated with both the source UE 605 and the destination UE 615 may be transmitted to the source UE 605 and/or to the destination UE 615 using an SCI message, a MAC control element (MAC-CE) message, or a similar message.

As shown by reference numbers 650, 655, 660, and 665, the source UE 605, the relay UE 610, and the destination UE 615 may perform sidelink communication in accordance with the first resource and/or the second resource (e.g., may perform sidelink communication using the UE-to-UE relay 620). More particularly, as shown by alternative 1 in FIG. 6, when the relay UE 610 is operating in a half-duplex mode, the second resource may be later in time (e.g., included in a later slot) than the first resource. In such aspects, as shown by reference number 650, the source UE 605 and the relay UE 610 may first perform sidelink communication (e.g., the source UE 605 may transfer a packet to the relay UE 610) in accordance with the first resource, and, as shown by reference number 655, the relay UE 610 and the destination UE 615 may perform sidelink communication (e.g., the relay UE 610 may forward the packet to the destination UE 615) in accordance with the second resource.

As shown by alternative 2 in FIG. 6, when the relay UE 610 is operating in a full-duplex mode, the first resource may be the same resource as the second resource. In such aspects, as shown by reference numbers 660 and 665, the source UE 605 and the relay UE 610 may perform sidelink communication (e.g., the source UE 605 may transfer a packet to the relay UE 610) in accordance with the first resource concurrently with the relay UE 610 and the destination UE 615 performing sidelink communication (e.g., the relay UE 610 forwarding a previously received packet to the destination UE 615) in accordance with the second resource.

In some aspects, the relay UE 610 may be in communication with a group of UEs (e.g., the source UE 605, the destination UE 615, and one or more other UEs), such as when one or more UEs are operating in groupcast mode or the like. In such aspects, in the reservation shown by reference number 635, the relay UE 610 may reserve coupled and/or coordinated resources for sidelink communication by multiple UEs in the group.

For example, the relay UE 610 may be in communication with a group of UEs, such as four UEs (referred to herein as UE1, UE2, UE3, and UE4). In other aspects, a group of UEs may include more or fewer UEs that the four UEs without departing from the scope of the disclosure. When a first UE (e.g., UE1) of the group of UEs is transmitting a groupcast message to other UEs in the group (e.g., one or more of UE2, UE3, or UE4), the relay UE 610 may reserve a first resource for a transmission from UE1 to the relay UE 610, and one or more resources for forwarding the transmission from the relay UE 610 to the other UEs. In some aspects, the relay UE 610 may forward the transmission to each UE in a single resource (e.g., a second resource), while in some other aspects the relay UE 610 may forward the transmission to the other UEs using more than one resource (e.g., using a second resource for forwarding the transmission to UE2, a third resource for forwarding the transmission to UE3, and/or a fourth resource for forwarding the transmission to UE4). In such aspects, the relay UE may transmit one or more group coordination and/or reservation messages to the various UEs of the group indicating the one or more resources. In such aspects, the one or more group coordination and/or reservation messages may indicate that the first resource is a preferred resource for use by UE1 and a non-preferred resource for use by UE2, UE3, and UE4, such that UE2, UE3, and UE4 do not attempt to reserve the first resource and/or transmit a communication during the first resource, which may otherwise interfere with a transmission from UE1 to the relay UE 610. The one or more group coordination and/or reservation messages may further indicate that the second resource is a non-preferred resource for use by UE2, UE3, and UE4, such that UE2, UE3, and UE4 do not attempt to reserve the second resource and/or transmit a communication during the second resource, and otherwise keep the second resource available for receiving a communication from the relay UE 610 to the UE2, UE3, and UE4. In some aspects, the one or more group coordination and/or reservation messages may be a single message (e.g., a single group coordination and/or reservation message) and/or may be transmitted using one of a groupcast message or a broadcast message. For example, the relay UE 610 may transmit a single groupcast message to the group of UEs indicating the resource reservations and/or other information. In such aspects, the single group coordination and/or reservation message may include an L1 destination identifier associated with the group of UEs such that all UEs in the group (e.g., UE1, UE2, UE3, and UE4) receive the reservation information.

In some other aspects, the group of UEs may include one or more source-destination pairs of UEs. For example, the source UE 605 and the destination UE 615 may form a first source-destination pair of UEs using the relay UE 610 for UE-to-UE relay communications, two other UEs may form a second source-destination pair of UEs using the relay UE 610 for UE-to-UE relay communications, and so forth. In such aspects, the relay UE 610 may reserve resources for each source-destination pair of UEs in a similar manner as described above in connection with the reservation of resources for the source UE 605 and the destination UE 615. In such aspects, the group coordination and/or reservation message indicating the resource reservations may be a broadcast message (e.g., a broadcast control message) or the like that indicates preferred and/or non-preferred resources for use by each UE of the group of UEs and/or each source-destination pair of UEs of the group of UEs. In some aspects, the broadcast message or the like may indicate preferred and/or non-preferred resources by associating an indication of the preferred and/or non-preferred resources associated with each UE with a corresponding L1 destination identifier of the UE.

In some aspects, in the reservation shown by reference number 635, the relay UE 610 may perform periodic resource reservation for a source-destination pair of UEs and/or for the group of UEs. For example, the relay UE 610 may reserve a resource (sometimes referred to as $R_i$) for each UE of the group of UEs (sometimes referred to as $UE_i$), with the pattern of reserved resources repeating once every N slots. In such aspects, the group coordination and/or reservation information message may indicate the periodicity of the resource reservation and/or may indicate a duration (e.g., a number of slots) for which the resource reservation is valid.

As indicated above, FIG. 6 is provided as an example. Other examples may differ from what is described with respect to FIG. 6.

Figure 7:
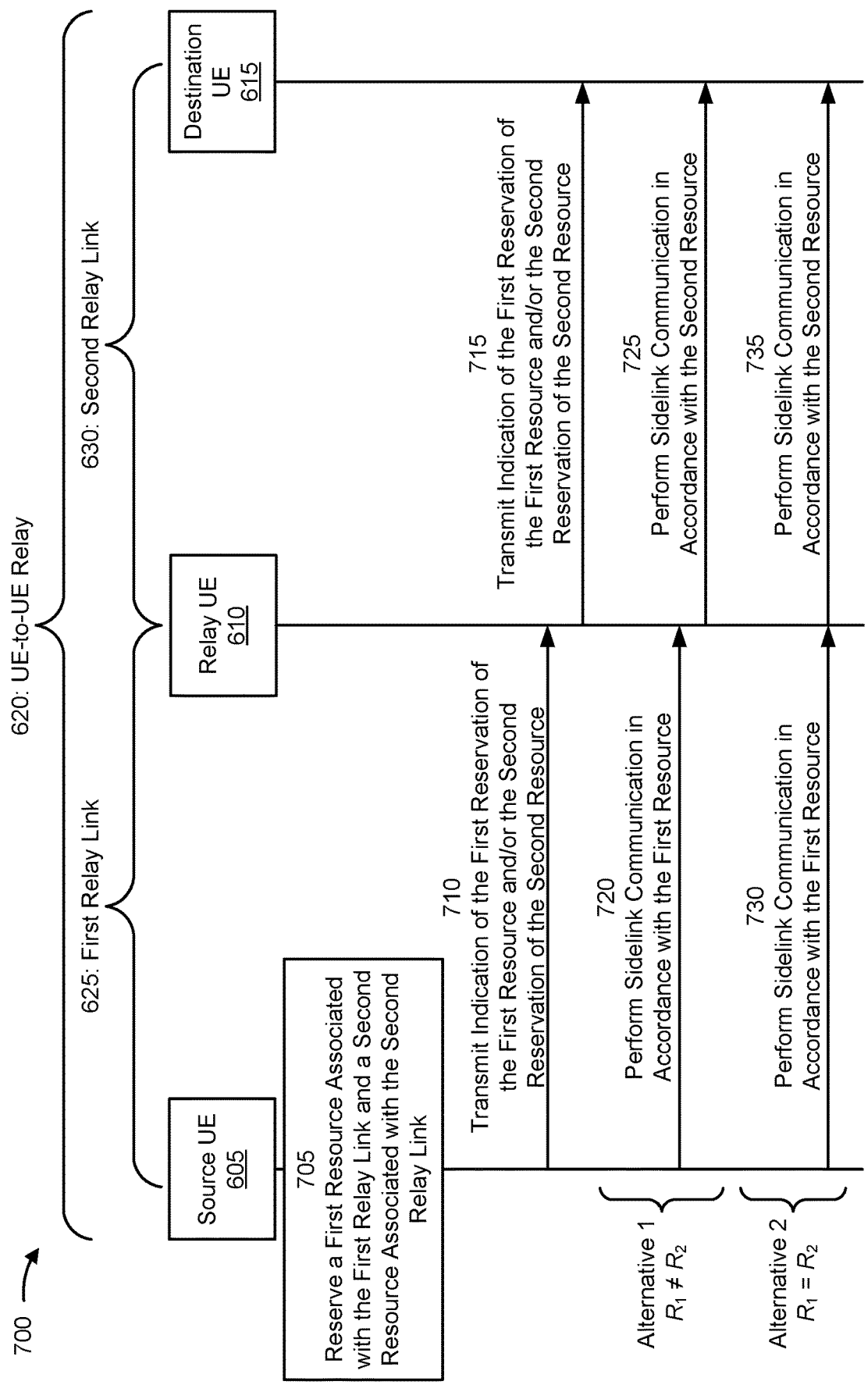
FIG. 7 is a diagram illustrating an example associated with resource reservations for UE relays, in accordance with the present disclosure.

FIG. 7 is a diagram illustrating an example 700 associated with resource reservations for UE relays, in accordance with the present disclosure.

In some aspects, the resource reservation for the UE-to-UE relay 620 may be performed by one or more remote UEs. For example, as shown in FIG. 7, the source UE 605 reserves resources for the UE-to-UE relay 620, but aspects of the disclosure are not so limited. In some other aspects, another remote UE (e.g., the destination UE 615) may reserve resources for the UE-to-UE relay 620 in a similar manner as described herein without departing from the scope of the disclosure.

As shown by reference number 705, the source UE 605 may make the first reservation of the first resource (e.g., time and/or frequency resources for performing a sidelink communication) associated with the first relay link 625 of the UE-to-UE relay 620, and the source UE 605 may make the second reservation of the second resource (e.g., time and/or frequency resources for performing a sidelink communication) associated with the second relay link 630 of the UE-to-UE relay 620. In some aspects, the first reservation of the first resource may be based at least in part on the second reservation of the second resource. More particularly, the source UE 605 may make a coordinated and/or coupled reservation of resources to enable a communication transmitted using the UE-to-UE relay 620 (e.g., a communication transmitted from the source UE 605 to the destination UE 615 via the relay UE 610) to be transmitted largely uninterrupted. Put another way, the source UE 605 may reserve the first resource and the second resource such that a packet (e.g., the TB 435) may be transmitted from the source UE 605 to the relay UE 610, and from the relay UE 610 to the destination UE 615, in a pipelined manner.

In some aspects, the source UE 605 may be unaware of the duplex capability of the relay UE 610, or else may be aware that the relay UE 610 is only capable of half-duplex communication and/or is operating in a half-duplex mode. In such aspects, the source UE 605 may reserve a second resource (e.g., $R_2$) that is later in time than a first resource (e.g., $R_1$). More particularly, the source UE 605 may reserve the first resource in a slot t for transmission of a packet p from the source UE 605 to the relay UE 610, and may reserve the second resource in a slot t+k for transmission of the packet p from the relay UE 610 to the destination UE 615.

In such aspects, as shown by reference number 710, the source UE 605 may transmit one or more inter-UE coordination and/or reservation messages to the relay UE 610 indicating the first reservation of the first resource and/or the second reservation of the second resource. For example, the source UE 605 may transmit a first inter-UE coordination and/or reservation message to the relay UE 610 that indicates that the first resource (e.g., $R_1$) is a non-preferred resource for the relay UE 610 to reserve and/or to use to transmit a message. In this way, the relay UE 610 will not reserve the first resource and/or will otherwise leave the first resource available for receiving a transmission from the source UE 605 to the relay UE 610. The source UE 605 may also transmit a second inter-UE coordination and/or reservation message to the relay UE 610 intended for the destination UE 615 (e.g., intended to be forwarded to the destination UE 615 via the UE-to-UE relay 620) that indicates that the second resource (e.g., $R_2$) is a non-preferred resource for the destination UE 615 to reserve and/or to transmit a message so that the destination UE 615 will not reserve the second resource and/or will otherwise leave the second resource available for receiving a transmission from the relay UE 610 to the destination UE 615. Upon receiving the second inter-UE coordination and/or reservation message, the relay UE 610 may forward the second inter-UE coordination and/or reservation message (including the indication of the first reservation of the first resource and/or the second reservation of the second resource) to the destination UE 615, as shown by reference number 715.

In some other aspects, an indication of the first reservation of the resource and of the second reservation of the second resource may be transmitted from the source UE 605 to the relay UE 610 using a single message (e.g., a single inter-UE coordination and/or reservation message). For example, the source UE 605 may transmit an inter-UE coordination and/or reservation message to the relay UE 610 that indicates both the first reservation of the first resource and the second reservation of the second resource. In some aspects, the inter-UE coordination and/or reservation message may include an L1 destination identifier associated with the relay UE 610 as well as an L1 destination identifier associated with the destination UE 615, indicating that the message is intended for both the relay UE 610 and the destination UE 615. Upon receipt of the inter-UE coordination and/or reservation message, the relay UE 610 may thus forward the inter-UE coordination and/or reservation message to the destination UE 615.

In some aspects, the source UE 605 (or other remote UE performing resource reservation) may be aware of the full-duplex capability of the relay UE 610 (e.g., whether the relay UE 610 is capable of full-duplex communication) and/or may be aware that the relay UE 610 is operating in a full-duplex mode. For example, in some aspects, the relay UE 610 may transmit to the source UE 605 (or other remote UE performing resource reservation) an indication of the full-duplex capability of the relay UE 610 (e.g., an indication that the relay UE 610 is capable of full-duplex communication and/or an indication that the relay UE 610 is operating in a full-duplex mode). In such aspects, the first resource and the second resource may be the same resource (e.g., R), and thus the indications shown by reference numbers 710 and 715 may indicate that the first resource is the second resource. In some aspects, the indications shown by reference numbers 710 and 715 (which may, in this case, indicate that the first resource is the second resource (e.g., $R_1=R_2=R$)) may be provided in independent inter-UE coordination and/or reservation messages (e.g., may be provided in a first inter-UE coordination and/or reservation message intended for the relay UE 610 and in a second inter-UE coordination and/or reservation message intended for the destination UE 615, which is forwarded to the destination UE 615 by the relay UE 610). In some other aspects, the indications shown by reference numbers 710 and 715 may be provided in a single message (e.g., a single inter-UE coordination and/or reservation message), which may include the L1 destination identifiers of both the relay UE 610 and the destination UE 615, as described. In some aspects, the reservation of the one or more resources (e.g., $R_1$, $R_2$, and/or R) may repeat according to a periodicity (e.g., may repeat every N slots), and thus the one or more inter-UE coordination and/or reservation messages may indicate a periodicity associated with the first reservation and/or the second reservation.

As shown by reference numbers 720, 725, 730, and 735, the source UE 605, the relay UE 610, and the destination UE 615 may perform sidelink communication in accordance with the first resource and/or the second resource (e.g., may perform sidelink communication using the UE-to-UE relay 620), in a similar manner as described above in connection with reference numbers 650, 655, 660, and 665. More particularly, as shown by alternative 1 in FIG. 7, when the relay UE 610 is operating in a half-duplex mode, the second resource may be later in time (e.g., included in a later slot) than the first resource. In such aspects, as shown by reference number 720, the source UE 605 and the relay UE 610 may first perform sidelink communication (e.g., the source UE 605 may transfer a packet to the relay UE 610) in accordance with the first resource, and, as shown by reference number 725, the relay UE 610 and the destination UE 615 may then perform sidelink communication (e.g., the relay UE 610 may forward the packet to the destination UE 615) in accordance with the second resource. As shown by alternative 2 in FIG. 7, when the relay UE 610 is operating in a full-duplex mode, the first resource may be the same resource as the second resource. In such aspects, as shown by reference numbers 730 and 735, the source UE 605 and the relay UE 610 may perform sidelink communication (e.g., the source UE 605 may transfer a packet to the relay UE 610) in accordance with the first resource concurrently with the relay UE 610 and the destination UE 615 performing sidelink communication (e.g., the relay UE 610 forwarding a previously received packet to the destination UE 615) in accordance with the second resource.

As indicated above, FIG. 7 is provided as an example. Other examples may differ from what is described with respect to FIG. 7.

Figure 8:
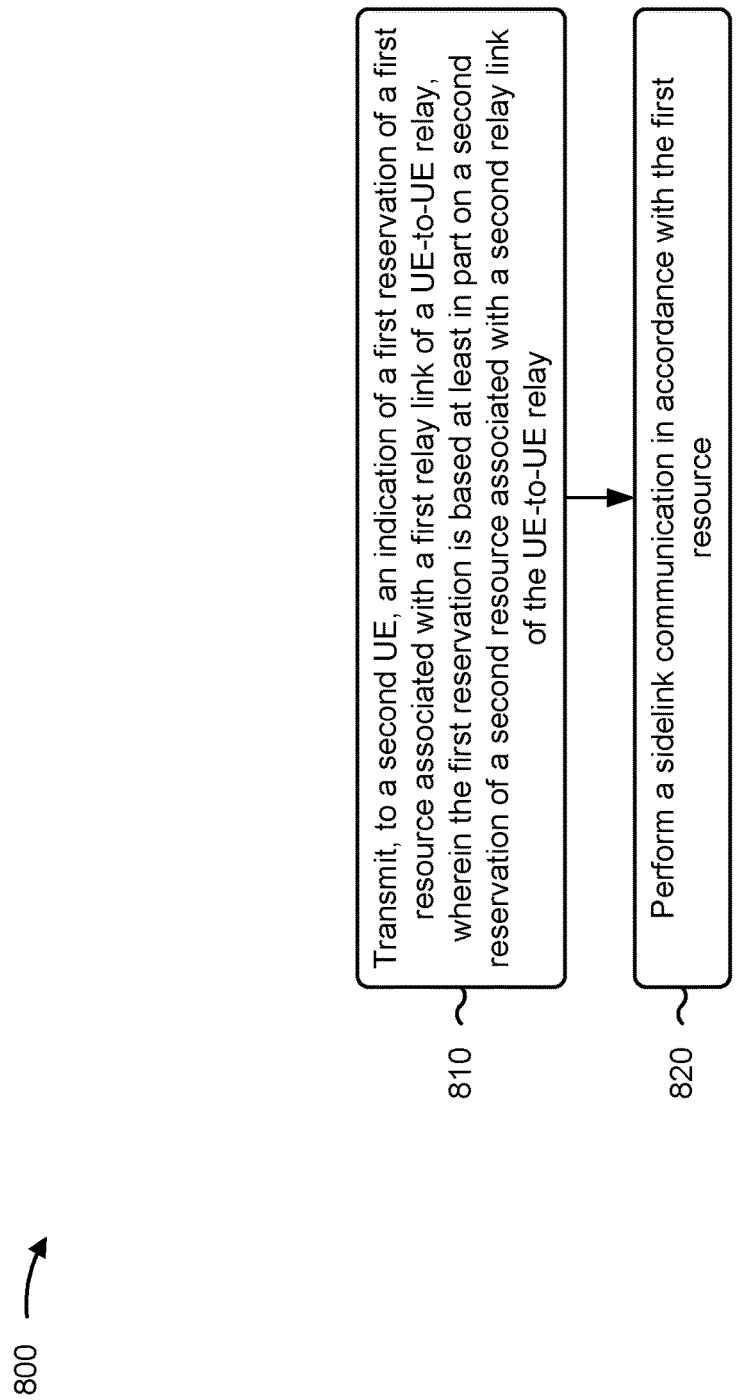
FIG. 8 is a diagram illustrating an example process performed, for example, by a first UE, in accordance with the present disclosure.

FIG. 8 is a diagram illustrating an example process 800 performed, for example, by a first UE, in accordance with the present disclosure. Example process 800 is an example where the first UE (e.g., UE 120, UE 405-1, UE 405-2, Tx/Rx UE 505, Rx/Tx UE 510, relay UE 530, source UE 605, relay UE 610, destination UE 615) performs operations associated with resource reservations for UE relays.

As shown in FIG. 8, in some aspects, process 800 may include transmitting, to a second UE, an indication of a first reservation of a first resource associated with a first relay link of a UE-to-UE relay, wherein the first reservation is based at least in part on a second reservation of a second resource associated with a second relay link of the UE-to-UE relay (block 810). For example, the first UE (e.g., using communication manager 1008, transmission component 1004, and/or reservation component 1010, depicted in FIG. 10) may transmit, to a second UE, an indication of a first reservation of a first resource associated with a first relay link of a UE-to-UE relay, wherein the first reservation is based at least in part on a second reservation of a second resource associated with a second relay link of the UE-to-UE relay, as described above.

As further shown in FIG. 8, in some aspects, process 800 may include performing a sidelink communication in accordance with the first resource (block 820). For example, the first UE (e.g., using communication manager 1008 and/or performance component 1012, depicted in FIG. 10) may perform a sidelink communication in accordance with the first resource, as described above.

Process 800 may include additional aspects, such as any single aspect or any combination of aspects described below and/or in connection with one or more other processes described elsewhere herein.

In a first aspect, the first UE is a relay UE associated with the UE-to-UE relay, the second UE and a third UE are remote UEs associated with UE-to-UE relay, the first UE is in communication with the second UE via the first relay link of the UE-to-UE relay, and the first UE is in communication with the third UE via the second relay link of the UE-to-UE relay.

In a second aspect, alone or in combination with the first aspect, the first resource is associated with a first slot, and the second resource is associated with a second slot occurring later in time than the first slot.

In a third aspect, alone or in combination with one or more of the first and second aspects, process 800 includes transmitting, to the second UE, an indication that the first resource is a preferred resource for use by the second UE to perform sidelink communication, and transmitting, to the third UE, an indication that the first resource is a non-preferred resource for use by the third UE to perform sidelink communication.

In a fourth aspect, alone or in combination with one or more of the first through third aspects, process 800 includes transmitting, to the third UE, an indication of the second reservation, the indication of the second reservation indicating that the second reservation is associated with a higher priority value for a communication by at least one of the first UE or the second UE than a priority value for a communication by the third UE associated with a previous reservation of the second resource.

In a fifth aspect, alone or in combination with one or more of the first through fourth aspects, process 800 includes transmitting the indication of the first reservation and an indication of the second reservation to both the second UE and the third UE using a single message, the message indicating that the first resource is a preferred resource for use by the second UE to perform sidelink communication, and the message further indicating that the first resource and the second resource are non-preferred resources for use by the third UE to perform sidelink communication.

In a sixth aspect, alone or in combination with one or more of the first through fifth aspects, the message indicates a first L1 identifier associated with the second UE and a second L1 identifier associated with the third UE.

In a seventh aspect, alone or in combination with one or more of the first through sixth aspects, the first UE is capable of full-duplex communication, and the first resource is the second resource.

In an eighth aspect, alone or in combination with one or more of the first through seventh aspects, process 800 includes transmitting an indication of the first reservation to both the second UE and the third UE using a single message, the message indicating that the first resource is a preferred resource for use by the second UE to perform sidelink communication, and the message further indicating that the first resource is a non-preferred resource for use by the third UE to perform sidelink communication.

In a ninth aspect, alone or in combination with one or more of the first through eighth aspects, the first UE is in communication with a group of UEs, the group of UEs includes the second UE and the third UE, and the indication of the first reservation and an indication of the second reservation are transmitted using one of a groupcast message or a broadcast message.

In a tenth aspect, alone or in combination with one or more of the first through ninth aspects, the one of the groupcast message or the broadcast message indicates an L1 identifier associated with the group.

In an eleventh aspect, alone or in combination with one or more of the first through tenth aspects, the one of the groupcast message or the broadcast message indicates an L1 identifier of each UE of the group of UEs.

In a twelfth aspect, alone or in combination with one or more of the first through eleventh aspects, the one of the groupcast message or the broadcast message indicates a periodicity associated with the first reservation and the second reservation.

In a thirteenth aspect, alone or in combination with one or more of the first through twelfth aspects, the first UE and a third UE are remote UEs associated with the UE-to-UE relay, the second UE is a relay UE associated with the UE-to-UE relay, the first UE is in communication with the second UE via the first relay link of UE-to-UE relay, and the second UE is in communication with a third UE via the second relay link of the UE-to-UE relay.

In a fourteenth aspect, alone or in combination with one or more of the first through thirteenth aspects, process 800 includes transmitting, to the second UE, an indication of the second reservation, the indication of the first reservation further indicating that the first resource is a non-preferred resource for use by the second UE to perform sidelink communication, and the indication of the second reservation further indicating that the second resource is a non-preferred resource for use by the third UE to perform sidelink communication.

In a fifteenth aspect, alone or in combination with one or more of the first through fourteenth aspects, process 800 includes transmitting, to the second UE, the indication of the first reservation and the indication of the second reservation using a single message.

In a sixteenth aspect, alone or in combination with one or more of the first through fifteenth aspects, the second UE is capable of full-duplex communication, and the first resource is the second resource.

In a seventeenth aspect, alone or in combination with one or more of the first through sixteenth aspects, the indication of the first reservation and the indication of the second reservation further indicate a periodicity associated with the first reservation and the second reservation, respectively.

In an eighteenth aspect, alone or in combination with one or more of the first through seventeenth aspects, process 800 includes transmitting, to the second UE, an indication of a first L1 identifier associated with the second UE and a second L1 identifier associated with the third UE.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
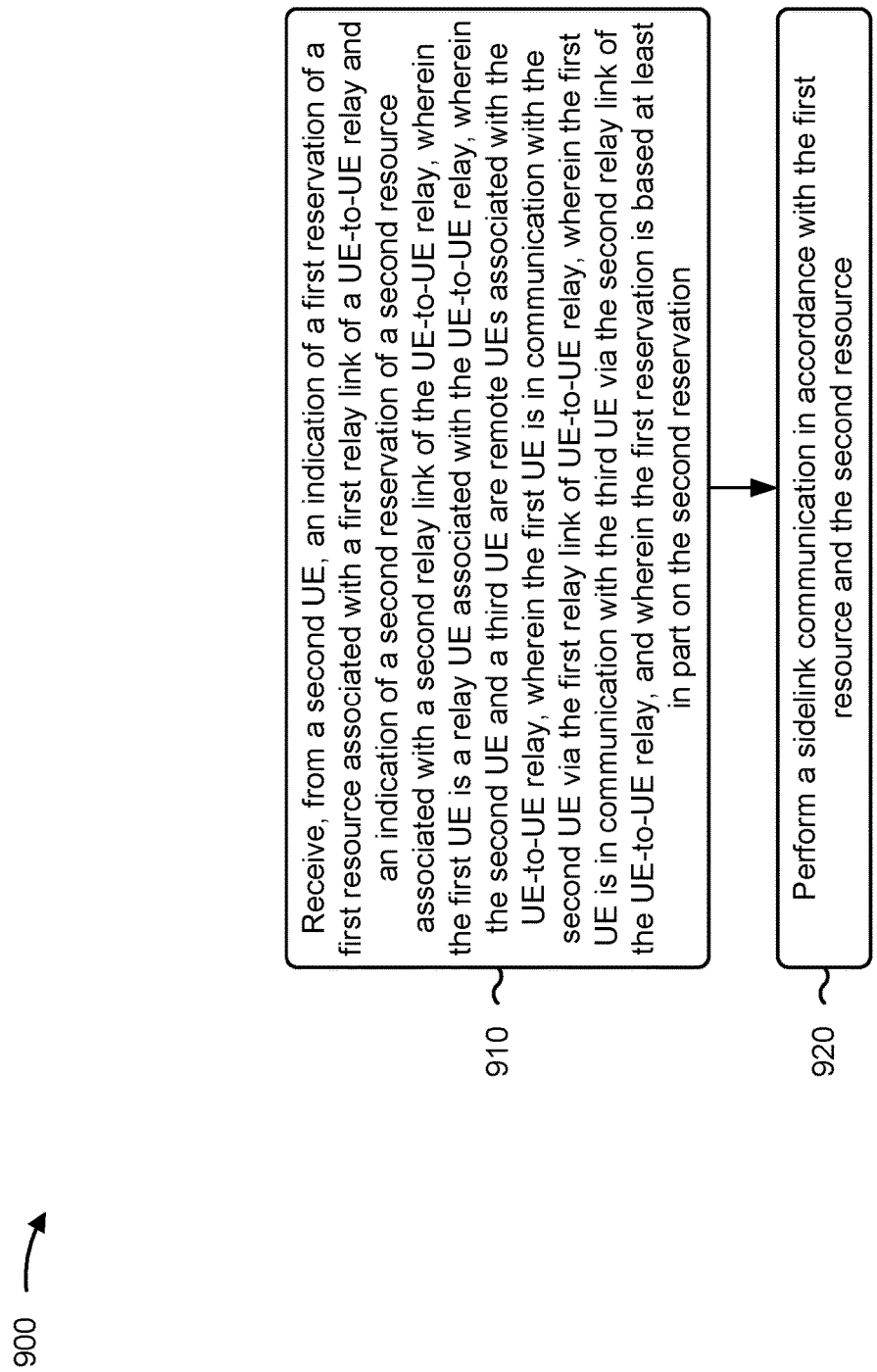
FIG. 9 is a diagram illustrating an example process performed, for example, by a first UE, in accordance with the present disclosure.

FIG. 9 is a diagram illustrating an example process 900 performed, for example, by a first UE, in accordance with the present disclosure. Example process 900 is an example where the first UE (e.g., UE 120, UE 405-1, UE 405-2, Tx/Rx UE 505, Rx/Tx UE 510, relay UE 530, source UE 605, relay UE 610, destination UE 615) performs operations associated with resource reservations for UE relays.

As shown in FIG. 9, in some aspects, process 900 may include receiving, from a second UE, an indication of a first reservation of a first resource associated with a first relay link of a UE-to-UE relay and an indication of a second reservation of a second resource associated with a second relay link of the UE-to-UE relay, wherein the first UE is a relay UE associated with the UE-to-UE relay, wherein the second UE and a third UE are remote UEs associated with the UE-to-UE relay, wherein the first UE is in communication with the second UE via the first relay link of UE-to-UE relay, wherein the first UE is in communication with the third UE via the second relay link of the UE-to-UE relay, and wherein the first reservation is based at least in part on the second reservation (block 910). For example, the first UE (e.g., using communication manager 1108, reception component 1102, and/or reservation component 1110 depicted in FIG. 11) may receive, from a second UE, an indication of a first reservation of a first resource associated with a first relay link of a UE-to-UE relay and an indication of a second reservation of a second resource associated with a second relay link of the UE-to-UE relay, wherein the first UE is a relay UE associated with the UE-to-UE relay, wherein the second UE and a third UE are remote UEs associated with the UE-to-UE relay, wherein the first UE is in communication with the second UE via the first relay link of UE-to-UE relay, wherein the first UE is in communication with the third UE via the second relay link of the UE-to-UE relay, and wherein the first reservation is based at least in part on the second reservation, as described above.

As further shown in FIG. 9, in some aspects, process 900 may include performing a sidelink communication in accordance with the first resource and the second resource (block 920). For example, the first UE (e.g., using communication manager 1108 and/or performance component 1112, depicted in FIG. 11) may perform a sidelink communication in accordance with the first resource and the second resource, as described above.

Process 900 may include additional aspects, such as any single aspect or any combination of aspects described below and/or in connection with one or more other processes described elsewhere herein.

In a first aspect, the indication of the first reservation further indicates that the first resource is a non-preferred resource for use by the first UE to perform sidelink communication, and the indication of the second reservation further indicates that the second resource is a non-preferred resource for use by the third UE to perform sidelink communication.

In a second aspect, alone or in combination with the first aspect, process 900 includes transmitting, to the third UE, the indication of the second reservation.

In a third aspect, alone or in combination with one or more of the first and second aspects, process 900 includes receiving, from the second UE, the indication of the first reservation and the indication of the second reservation in a single message.

In a fourth aspect, alone or in combination with one or more of the first through third aspects, process 900 includes transmitting, to the third UE, another message indicating that the second resource is a non-preferred resource for use by the third UE to perform sidelink communication.

In a fifth aspect, alone or in combination with one or more of the first through fourth aspects, the first UE is capable of full-duplex communication, and the first resource is the second resource.

In a sixth aspect, alone or in combination with one or more of the first through fifth aspects, process 900 includes transmitting, to the third UE, the indication of the second reservation.

In a seventh aspect, alone or in combination with one or more of the first through sixth aspects, the indication of the first reservation and the indication of the second reservation further indicate a periodicity associated with the first reservation and the second reservation, respectively.

In an eighth aspect, alone or in combination with one or more of the first through seventh aspects, process 900 includes receiving, from the second UE, an indication of a first L1 identifier associated with the first UE and a second L1 identifier associated with the third UE.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
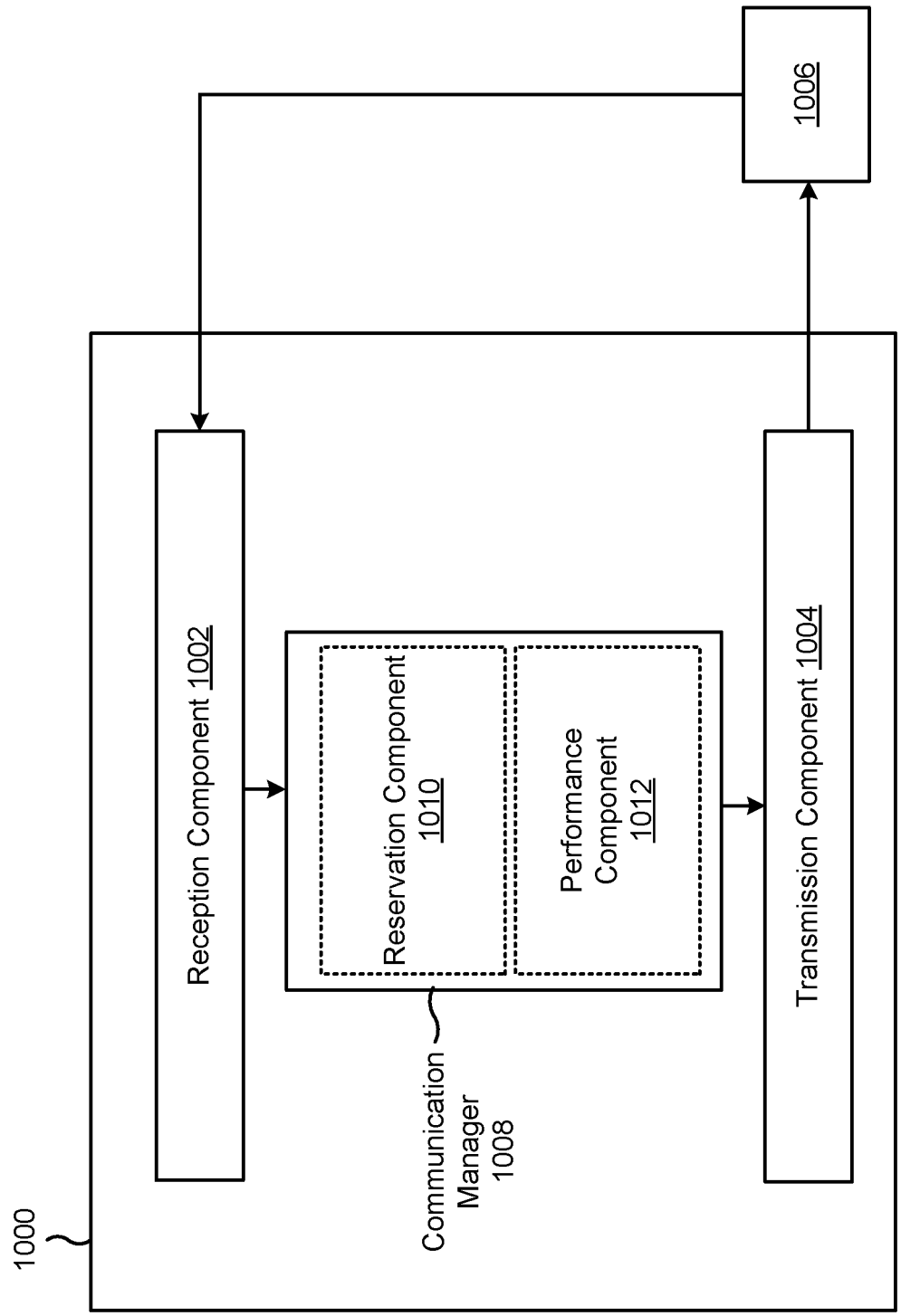
FIG. 10 is a diagram of an example apparatus for wireless communication, in accordance with the present disclosure.

FIG. 10 is a diagram of an example apparatus 1000 for wireless communication, in accordance with the present disclosure. The apparatus 1000 may be a UE (e.g., a first UE), or a UE may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include the communication manager 1008 (e.g., communication manager 140). The communication manager 1008 may include one or more of a reservation component 1010, or a performance component 1012, among other examples.

In some aspects, the apparatus 1000 may be configured to perform one or more operations described herein in connection with FIGS. 6-7. Additionally, or alternatively, the apparatus 1000 may be configured to perform one or more processes described herein, such as process 800 of FIG. 8. In some aspects, the apparatus 1000 and/or one or more components shown in FIG. 10 may include one or more components of the UE described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the UE described in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the UE described in connection with FIG. 2. In some aspects, the transmission component 1004 may be co-located with the reception component 1002 in a transceiver.

The transmission component 1004 and/or the reservation component 1010 may transmit, to a second UE, an indication of a first reservation of a first resource associated with a first relay link of a UE-to-UE relay, wherein the first reservation is based at least in part on a second reservation of a second resource associated with a second relay link of the UE-to-UE relay. The performance component 1012 may perform a sidelink communication in accordance with the first resource.

The transmission component 1004 may transmit, to the second UE, an indication that the first resource is a preferred resource for use by the second UE to perform sidelink communication.

The transmission component 1004 may transmit, to the third UE, an indication that the first resource is a non-preferred resource for use by the third UE to perform sidelink communication.

The transmission component 1004 and/or the reservation component 1010 may transmit, to the third UE, an indication of the second reservation, wherein the indication of the second reservation indicates that the second reservation is associated with a higher priority value for a communication by at least one of the first UE or the second UE than a priority value for a communication by the third UE associated with a previous reservation of the second resource.

The transmission component 1004 and/or the reservation component 1010 may transmit the indication of the first reservation and an indication of the second reservation to both the second UE and the third UE using a single message, wherein the message indicates that the first resource is a preferred resource for use by the second UE to perform sidelink communication, and wherein the message further indicates that the first resource and the second resource are non-preferred resources for use by the third UE to perform sidelink communication.

The transmission component 1004 and/or the reservation component 1010 may transmit an indication of the first reservation to both the second UE and the third UE using a single message, wherein the message indicates that the first resource is a preferred resource for use by the second UE to perform sidelink communication, and wherein the message further indicates that the first resource is a non-preferred resource for use by the third UE to perform sidelink communication.

The transmission component 1004 and/or the reservation component 1010 may transmit, to the second UE, an indication of the second reservation, wherein the indication of the first reservation further indicates that the first resource is a non-preferred resource for use by the second UE to perform sidelink communication, and wherein the indication of the second reservation further indicates that the second resource is a non-preferred resource for use by the third UE to perform sidelink communication.

The transmission component 1004 and/or the reservation component 1010 may transmit, to the second UE, the indication of the first reservation and the indication of the second reservation using a single message.

The transmission component 1004 may transmit, to the second UE, an indication of a first L1 identifier associated with the second UE and a second L1 identifier associated with the third UE.

Figure 11:
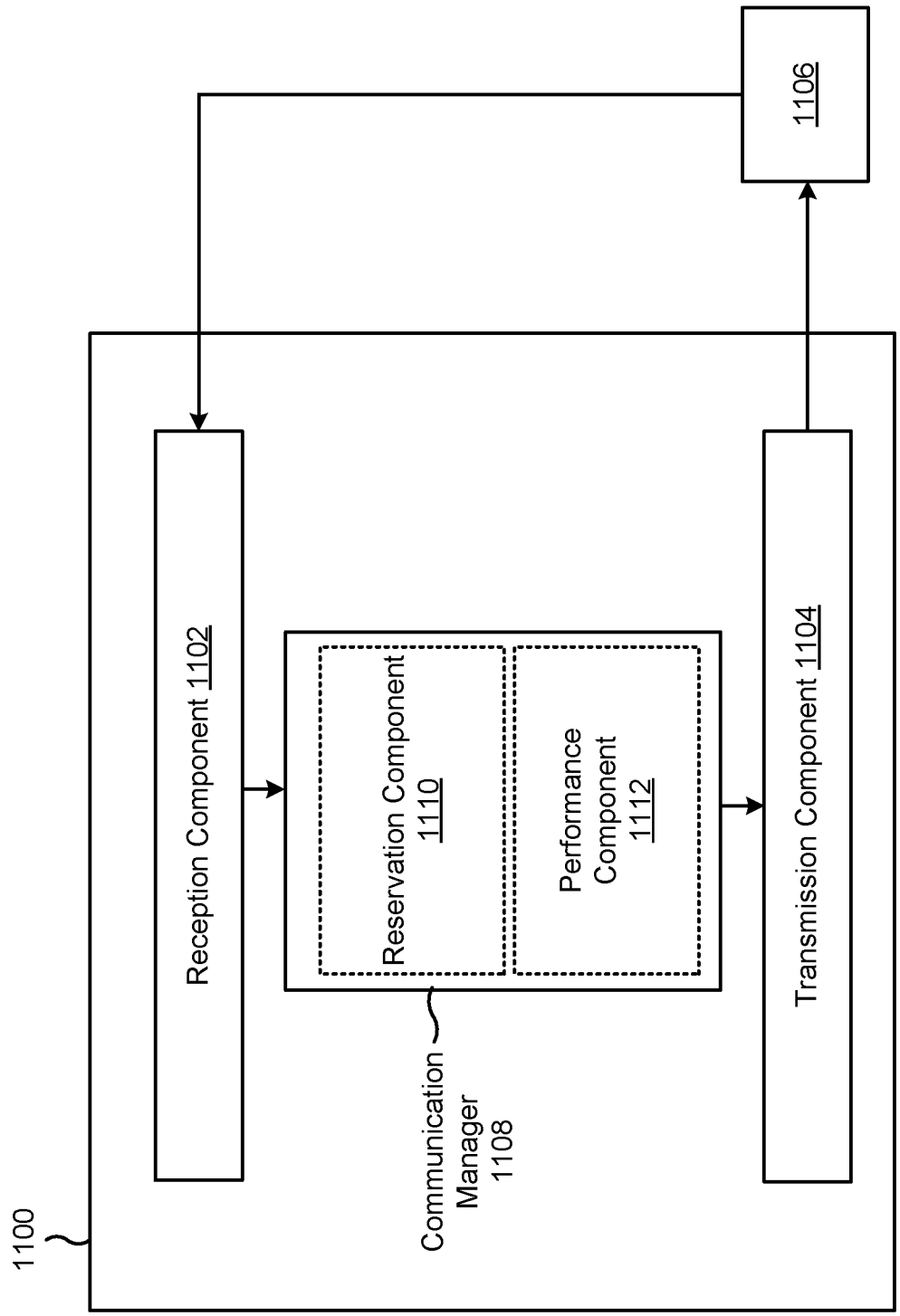
FIG. 11 is a diagram of an example apparatus for wireless communication, in accordance with the present disclosure.

FIG. 11 is a diagram of an example apparatus 1100 for wireless communication, in accordance with the present disclosure. The apparatus 1100 may be a UE (e.g., a first UE), or a UE may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include the communication manager 1108 (e.g., communication manager 140). The communication manager 1108 may include one or more of a reservation component 1110, or a performance component 1112, among other examples.

In some aspects, the apparatus 1100 may be configured to perform one or more operations described herein in connection with FIGS. 6-7. Additionally, or alternatively, the apparatus 1100 may be configured to perform one or more processes described herein, such as process 900 of FIG. 9. In some aspects, the apparatus 1100 and/or one or more components shown in FIG. 11 may include one or more components of the UE described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a modem, a demodulator, a MIMO detector, a receive processor, a controller/processor, a memory, or a combination thereof, of the UE described in connection with FIG. 2.

The transmission component 1104 may transmit communications, such as reference signals, control information, data communications, or a combination thereof, to the apparatus 1106. In some aspects, one or more other components of the apparatus 1100 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modem, a modulator, a transmit MIMO processor, a transmit processor, a controller/processor, a memory, or a combination thereof, of the UE described in connection with FIG. 2. In some aspects, the transmission component 1104 may be co-located with the reception component 1102 in a transceiver.

The reception component 1102 and/or the reservation component 1110 may receive, from a second UE, an indication of a first reservation of a first resource associated with a first relay link of a UE-to-UE relay and an indication of a second reservation of a second resource associated with a second relay link of the UE-to-UE relay, wherein the first UE is a relay UE associated with the UE-to-UE relay, wherein the second UE and a third UE are remote UEs associated with the UE-to-UE relay, wherein the first UE is in communication with the second UE via the first relay link of UE-to-UE relay, wherein the first UE is in communication with the third UE via the second relay link of the UE-to-UE relay, and wherein the first reservation is based at least in part on the second reservation. The performance component 1112 may perform a sidelink communication in accordance with the first resource and the second resource.

The transmission component 1104 and/or the reservation component 1110 may transmit, to the third UE, the indication of the second reservation.

The reception component 1102 and/or the reservation component 1110 may receive, from the second UE, the indication of the first reservation and the indication of the second reservation in a single message.

The transmission component 1104 may transmit, to the third UE, another message indicating that the second resource is a non-preferred resource for use by the third UE to perform sidelink communication.

The transmission component 1104 and/or the reservation component 1110 may transmit, to the third UE, the indication of the second reservation.

The reception component 1102 may receive, from the second UE, an indication of a first L1 identifier associated with the first UE and a second L1 identifier associated with the third UE.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

The following provides an overview of some Aspects of the present disclosure:

Aspect 1: A method of wireless communication performed by a first UE, comprising: transmitting, to a second UE, an indication of a first reservation of a first resource associated with a first relay link of a UE-to-UE relay, wherein the first reservation is based at least in part on a second reservation of a second resource associated with a second relay link of the UE-to-UE relay; and performing a sidelink communication in accordance with the first resource.

Aspect 2: The method of Aspect 1, wherein the first UE is a relay UE associated with the UE-to-UE relay, wherein the second UE and a third UE are remote UEs associated with UE-to-UE relay, wherein the first UE is in communication with the second UE via the first relay link of the UE-to-UE relay, and wherein the first UE is in communication with the third UE via the second relay link of the UE-to-UE relay.

Aspect 3: The method of Aspect 2, wherein the first resource is associated with a first slot, and wherein the second resource is associated with a second slot occurring later in time than the first slot.

Aspect 4: The method of any of aspects Aspect 2-3, further comprising: transmitting, to the second UE, an indication that the first resource is a preferred resource for use by the second UE to perform sidelink communication; and transmitting, to the third UE, an indication that the first resource is a non-preferred resource for use by the third UE to perform sidelink communication.

Aspect 5: The method of any of Aspects 2-4, further comprising transmitting, to the third UE, an indication of the second reservation, wherein the indication of the second reservation indicates that the second reservation is associated with a higher priority value for a communication by at least one of the first UE or the second UE than a priority value for a communication by the third UE associated with a previous reservation of the second resource.

Aspect 6: The method of any of Aspects 2-5, further comprising transmitting the indication of the first reservation and an indication of the second reservation to both the second UE and the third UE using a single message, wherein the message indicates that the first resource is a preferred resource for use by the second UE to perform sidelink communication, and wherein the message further indicates that the first resource and the second resource are non-preferred resources for use by the third UE to perform sidelink communication.

Aspect 7: The method of Aspect 6, wherein the message indicates a first L1 identifier associated with the second UE and a second L1 identifier associated with the third UE.

Aspect 8: The method of any of Aspects 2-7, wherein the first UE is capable of full-duplex communication, and wherein the first resource is the second resource.

Aspect 9: The method of Aspect 8, further comprising transmitting an indication of the first reservation to both the second UE and the third UE using a single message, wherein the message indicates that the first resource is a preferred resource for use by the second UE to perform sidelink communication, and wherein the message further indicates that the first resource is a non-preferred resource for use by the third UE to perform sidelink communication.

Aspect 10: The method of any of Aspects 2-9, wherein the first UE is in communication with a group of UEs, wherein the group of UEs includes the second UE and the third UE, and wherein the indication of the first reservation and an indication of the second reservation are transmitted using one of a groupcast message or a broadcast message.

Aspect 11: The method of Aspect 10, wherein the one of the groupcast message or the broadcast message indicates an L1 identifier associated with the group.

Aspect 12: The method of any of Aspects 10-11, wherein the one of the groupcast message or the broadcast message indicates an L1 identifier of each UE of the group of UEs.

Aspect 13: The method of any of Aspects 10-12, wherein the one of the groupcast message or the broadcast message indicates a periodicity associated with the first reservation and the second reservation.

Aspect 14: The method of Aspect 1, wherein the first UE and a third UE are remote UEs associated with the UE-to-UE relay, wherein the second UE is a relay UE associated with the UE-to-UE relay, wherein the first UE is in communication with the second UE via the first relay link of UE-to-UE relay, and wherein the second UE is in communication with a third UE via the second relay link of the UE-to-UE relay.

Aspect 15: The method of Aspect 14, further comprising transmitting, to the second UE, an indication of the second reservation, wherein the indication of the first reservation further indicates that the first resource is a non-preferred resource for use by the second UE to perform sidelink communication, and wherein the indication of the second reservation further indicates that the second resource is a non-preferred resource for use by the third UE to perform sidelink communication.

Aspect 16: The method of Aspect 15, further comprising transmitting, to the second UE, the indication of the first reservation and the indication of the second reservation using a single message.

Aspect 17: The method of any of Aspects 14-16, wherein the second UE is capable of full-duplex communication, and wherein the first resource is the second resource.

Aspect 18: The method of Aspect 17, wherein the indication of the first reservation and the indication of the second reservation further indicate a periodicity associated with the first reservation and the second reservation, respectively.

Aspect 19: The method of any of Aspects 14-18, further comprising transmitting, to the second UE, an indication of a first L1 identifier associated with the second UE and a second L1 identifier associated with the third UE.

Aspect 20: A method of wireless communication performed by a first UE, comprising: receiving, from a second UE, an indication of a first reservation of a first resource associated with a first relay link of a UE-to-UE relay and an indication of a second reservation of a second resource associated with a second relay link of the UE-to-UE relay, wherein the first UE is a relay UE associated with the UE-to-UE relay, wherein the second UE and a third UE are remote UEs associated with the UE-to-UE relay, wherein the first UE is in communication with the second UE via the first relay link of UE-to-UE relay, wherein the first UE is in communication with the third UE via the second relay link of the UE-to-UE relay, and wherein the first reservation is based at least in part on the second reservation; and performing a sidelink communication in accordance with the first resource and the second resource.

Aspect 21: The method of Aspect 20, wherein the indication of the first reservation further indicates that the first resource is a non-preferred resource for use by the first UE to perform sidelink communication, and wherein the indication of the second reservation further indicates that the second resource is a non-preferred resource for use by the third UE to perform sidelink communication.

Aspect 22: The method of Aspect 21, further comprising transmitting, to the third UE, the indication of the second reservation.

Aspect 23: The method of any of Aspects 20-22, further comprising receiving, from the second UE, the indication of the first reservation and the indication of the second reservation in a single message.

Aspect 24: The method of Aspect 23, further comprising transmitting, to the third UE, another message indicating that the second resource is a non-preferred resource for use by the third UE to perform sidelink communication.

Aspect 25: The method of any of Aspects 20-24, wherein the first UE is capable of full-duplex communication, and wherein the first resource is the second resource.

Aspect 26: The method of Aspect 25, further comprising transmitting, to the third UE, the indication of the second reservation.

Aspect 27: The method of any of Aspects 20-26, wherein the indication of the first reservation and the indication of the second reservation further indicate a periodicity associated with the first reservation and the second reservation, respectively.

Aspect 28: The method of any of Aspects 20-27, further comprising receiving, from the second UE, an indication of a first L1 identifier associated with the first UE and a second L1 identifier associated with the third UE.

Aspect 29: An apparatus for wireless communication at a device, comprising a processor; memory coupled with the processor; and instructions stored in the memory and executable by the processor to cause the apparatus to perform the method of one or more of Aspects 1-19.

Aspect 30: A device for wireless communication, comprising a memory and one or more processors coupled to the memory, the one or more processors configured to perform the method of one or more of Aspects 1-19.

Aspect 31: An apparatus for wireless communication, comprising at least one means for performing the method of one or more of Aspects 1-19.

Aspect 32: A non-transitory computer-readable medium storing code for wireless communication, the code comprising instructions executable by a processor to perform the method of one or more of Aspects 1-19.

Aspect 33: A non-transitory computer-readable medium storing a set of instructions for wireless communication, the set of instructions comprising one or more instructions that, when executed by one or more processors of a device, cause the device to perform the method of one or more of Aspects 1-19.

Aspect 34: An apparatus for wireless communication at a device, comprising a processor; memory coupled with the processor; and instructions stored in the memory and executable by the processor to cause the apparatus to perform the method of one or more of Aspects 20-28.

Aspect 35: A device for wireless communication, comprising a memory and one or more processors coupled to the memory, the one or more processors configured to perform the method of one or more of Aspects 20-28.

Aspect 36: An apparatus for wireless communication, comprising at least one means for performing the method of one or more of Aspects 20-28.

Aspect 37: A non-transitory computer-readable medium storing code for wireless communication, the code comprising instructions executable by a processor to perform the method of one or more of Aspects 20-28.

Aspect 38: A non-transitory computer-readable medium storing a set of instructions for wireless communication, the set of instructions comprising one or more instructions that, when executed by one or more processors of a device, cause the device to perform the method of one or more of Aspects 20-28.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the team "or" is intended to be inclusive when used in a series and may be used interchangeably with "and/or," unless explicitly stated otherwise (e.g., if used in combination with "either" or "only one of").

What is claimed is:

1. An apparatus for wireless communication at a first user equipment (UE), comprising:
one or more memories; and
one or more processors, coupled to the one or more memories, configured to:
transmit, to a second UE, sidelink control information (SCI) comprising an indication of a first reservation of a first resource for a sidelink communication associated with a first relay link of a UE-to-UE relay, wherein the first reservation is based at least in part on a duplexing capability of the first UE and based at least in part on a second reservation of a second resource, for the sidelink communication, associated with a second relay link of the UE-to-UE relay; and
perform the sidelink communication in accordance with the first resource.

2. The apparatus of claim 1,
wherein the first UE is a relay UE associated with the UE-to-UE relay, wherein the second UE and a third UE are remote UEs associated with the UE-to-UE relay, wherein the first UE is in communication with the second UE via the first relay link of the UE-to-UE relay, and wherein the first UE is in communication with the third UE via the second relay link of the UE-to-UE relay.

3. The apparatus of claim 2,
wherein the first resource is associated with a first slot, and wherein the second resource is associated with a second slot occurring later in time than the first slot.

4. The apparatus of claim 2,
wherein the one or more processors are further configured to:
transmit, to the second UE, an indication that the first resource is a preferred resource for use by the second UE to perform sidelink communication; and
transmit, to the third UE, an indication that the first resource is a non-preferred resource for use by the third UE to perform sidelink communication.

5. The apparatus of claim 2,
wherein the one or more processors are further configured to transmit, to the third UE, an indication of the second reservation, wherein the indication of the second reservation indicates that the second reservation is associated with a higher priority value for a communication by at least one of the first UE or the second UE than a priority value for a communication by the third UE associated with a previous reservation of the second resource.

6. The apparatus of claim 2,
wherein the one or more processors are further configured to transmit the indication of the first reservation and an indication of the second reservation to both the second UE and the third UE using a single message, wherein the single message indicates that the first resource is a preferred resource for use by the second UE to perform sidelink communication, and wherein the single message further indicates that the first resource and the second resource are non-preferred resources for use by the third UE to perform sidelink communication.

7. The apparatus of claim 6,
wherein the single message indicates a first layer 1 (L1) identifier associated with the second UE and a second L1 identifier associated with the third UE.

8. The apparatus of claim 2,
wherein the first UE is capable of full-duplex communication, and wherein the first resource is the second resource.

9. The apparatus of claim 2,
wherein the first UE is in communication with a group of UEs, wherein the group of UEs includes the second UE and the third UE, and wherein the indication of the first reservation and an indication of the second reservation are transmitted using one of a groupcast message or a broadcast message.

10. The apparatus of claim 9,
wherein the one of the groupcast message or the broadcast message indicates a layer 1 (L1) identifier associated with the group.

11. The apparatus of claim 9,
wherein the one of the groupcast message or the broadcast message indicates a layer 1 (L1) identifier of each UE of the group of UEs.

12. The apparatus of claim 9,
wherein the one of the groupcast message or the broadcast message indicates a periodicity associated with the first reservation and the second reservation.

13. The apparatus of claim 1,
wherein the first UE and a third UE are remote UEs associated with the UE-to-UE relay, wherein the second UE is a relay UE associated with the UE-to-UE relay, wherein the first UE is in communication with the second UE via the first relay link of UE-to-UE relay, and wherein the second UE is in communication with the third UE via the second relay link of the UE-to-UE relay.

14. The apparatus of claim 13,
wherein the one or more processors are further configured to transmit, to the second UE, an indication of the second reservation, wherein the indication of the first reservation further indicates that the first resource is a non-preferred resource for use by the second UE to perform sidelink communication, and wherein the indication of the second reservation further indicates that the second resource is a non-preferred resource for use by the third UE to perform sidelink communication.

15. The apparatus of claim 14,
wherein the one or more processors are further configured to transmit, to the second UE, the indication of the first reservation and the indication of the second reservation using a single message.

16. The apparatus of claim 14,
wherein the second UE is capable of full-duplex communication, and wherein the first resource is the second resource.

17. The apparatus of claim 16,
wherein the indication of the first reservation and the indication of the second reservation further indicate a periodicity associated with the first reservation and the second reservation, respectively.

18. The apparatus of claim 16,
wherein the one or more processors are further configured to transmit, to the second UE, an indication of a first layer 1 (L1) identifier associated with the second UE and a second L1 identifier associated with the third UE.

19. An apparatus for wireless communication at a first user equipment (UE), comprising:
one or more memories; and
one or more processors, coupled to the one or more memories, configured to:
receive, from a second UE, sidelink control information (SCI) comprising an indication of a first reservation of a first resource for a sidelink communication associated with a first relay link of a UE-to-UE relay and an indication of a second reservation of a second resource, for the sidelink communication, associated with a second relay link of the UE-to-UE relay, wherein the first UE is a relay UE associated with the UE-to-UE relay, wherein the second UE and a third UE are remote UEs associated with the UE-to-UE relay, wherein the first UE is in communication with the second UE via the first relay link of UE-to-UE relay, wherein the first UE is in communication with the third UE via the second relay link of the UE-to-UE relay, and wherein the first reservation is based at least in part on a duplexing capability of the second UE and based at least in part on the second reservation; and
perform the sidelink communication in accordance with the first resource and the second resource.

20. The apparatus of claim 19,
wherein the indication of the first reservation further indicates that the first resource is a non-preferred resource for use by the first UE to perform sidelink communication, and wherein the indication of the second reservation further indicates that the second resource is a non-preferred resource for use by the third UE to perform sidelink communication.

21. The apparatus of claim 20,
wherein the one or more processors are further configured to transmit, to the third UE, the indication of the second reservation.

22. The apparatus of claim 19,
wherein the one or more processors are further configured to receive, from the second UE, the indication of the first reservation and the indication of the second reservation in a single message.

23. The apparatus of claim 22,
wherein the one or more processors are further configured to transmit, to the third UE, another message indicating that the second resource is a non-preferred resource for use by the third UE to perform sidelink communication.

24. The apparatus of claim 19,
wherein the first UE is capable of full-duplex communication, and wherein the first resource is the second resource.

25. The apparatus of claim 24,
wherein the indication of the first reservation and the indication of the second reservation further indicate a periodicity associated with the first reservation and the second reservation, respectively.

26. The apparatus of claim 24,
wherein the one or more processors are further configured to receive, from the second UE, an indication of a first layer 1 (L1) identifier associated with the first UE and a second L1 identifier associated with the third UE.

27. A method of wireless communication performed by a first user equipment (UE), comprising:
transmitting, to a second UE, sidelink control information (SCI) comprising an indication of a first reservation of a first resource for a sidelink communication associated with a first relay link of a UE-to-UE relay, wherein the first reservation is based at least in part on a duplexing capability of the first UE and based at least in part on a second reservation of a second resource, for the sidelink communication, associated with a second relay link of the UE-to-UE relay; and
performing the sidelink communication in accordance with the first resource.

28. The method of claim 27,
wherein the first UE and a third UE are remote UEs associated with the UE-to-UE relay, wherein the second UE is a relay UE associated with the UE-to-UE relay, wherein the first UE is in communication with the second UE via the first relay link of UE-to-UE relay, and wherein the second UE is in communication with the third UE via the second relay link of the UE-to-UE relay.

29. A method of wireless communication performed by a first user equipment (UE), comprising:
receiving, from a second UE, sidelink control information (SCI) comprising an indication of a first reservation of a first resource for a sidelink communication associated with a first relay link of a UE-to-UE relay and an indication of a second reservation of a second resource, for the sidelink communication, associated with a second relay link of the UE-to-UE relay, wherein the first UE is a relay UE associated with the UE-to-UE relay, wherein the second UE and a third UE are remote UEs associated with the UE-to-UE relay, wherein the first UE is in communication with the second UE via the first relay link of UE-to-UE relay, wherein the first UE is in communication with the third UE via the second relay link of the UE-to-UE relay, and wherein the first reservation is based at least in part on a duplexing capability of the second UE and based at least in part on the second reservation; and
performing the sidelink communication in accordance with the first resource and the second resource.

30. The method of claim 29,
wherein the indication of the first reservation further indicates that the first resource is a non-preferred resource for use by the first UE to perform sidelink communication, and wherein the indication of the second reservation further indicates that the second resource is a non-preferred resource for use by the third UE to perform sidelink communication.

* * * * *